(12) United States Patent
Grappe

(10) Patent No.: US 10,527,221 B2
(45) Date of Patent: Jan. 7, 2020

(54) APPARATUS FOR STORING AND TRANSPORTING ITEMS

(71) Applicant: James Daniel Grappe, Austin, TX (US)

(72) Inventor: James Daniel Grappe, Austin, TX (US)

(*) Notice: Subject to any disclaimer, the term of this patent is extended or adjusted under 35 U.S.C. 154(b) by 54 days.

(21) Appl. No.: 15/848,592

(22) Filed: Dec. 20, 2017

(65) Prior Publication Data

US 2018/0172204 A1 Jun. 21, 2018

Related U.S. Application Data

(60) Provisional application No. 62/436,567, filed on Dec. 20, 2016.

(51) Int. Cl.
| | |
|---|---|
| *F16M 11/38* | (2006.01) |
| *B66F 7/06* | (2006.01) |
| *B62B 3/02* | (2006.01) |
| *A47B 3/02* | (2006.01) |
| *B62B 3/10* | (2006.01) |
| *B62B 5/06* | (2006.01) |
| *A47C 4/28* | (2006.01) |
| *B62B 5/00* | (2006.01) |
| *A47C 4/48* | (2006.01) |
| *A47C 4/38* | (2006.01) |
| *F16M 11/42* | (2006.01) |
| *F16M 11/04* | (2006.01) |

(52) U.S. Cl.
CPC .............. *F16M 11/38* (2013.01); *A47B 3/02* (2013.01); *A47C 4/28* (2013.01); *A47C 4/38* (2013.01); *A47C 4/48* (2013.01); *B62B 3/02* (2013.01); *B62B 3/10* (2013.01); *B62B 5/0033* (2013.01); *B62B 5/06* (2013.01); *B66F 7/0625* (2013.01); *B66F 7/0666* (2013.01); *F16M 11/046* (2013.01); *F16M 11/42* (2013.01); *F16M 2200/028* (2013.01); *F16M 2200/061* (2013.01)

(58) Field of Classification Search
CPC ....... B66F 7/0675; B66F 7/0666; D06F 57/10
See application file for complete search history.

(56) References Cited

U.S. PATENT DOCUMENTS

| | | | | |
|---|---|---|---|---|
| 1,345,564 | A * | 7/1920 | Thomas | ................ B66F 7/0625 254/9 C |
| 1,814,838 | A * | 7/1931 | Martin | ..................... A47B 3/02 108/99 |
| 2,927,702 | A * | 3/1960 | Deusen, Jr. | .............. A47B 3/02 108/96 |

(Continued)

FOREIGN PATENT DOCUMENTS

EP 1994865 A1 11/2008

*Primary Examiner* — Mark C Hageman
(74) *Attorney, Agent, or Firm* — Matheson Keys & Kordzik PLLC; Kelly Kordzik

(57) ABSTRACT

A store, move, and/or use apparatus for storing, moving, and using items implements an extendable support mechanism so that various work surfaces can be manually positioned at various elevations relative to the ground. The extendable support mechanism utilizes a plurality of support legs configured as a scissor lift. A storage container may be mounted on top of the extendable support mechanism. Additionally, wheel assemblies may be implemented to enable a user to move the apparatus.

19 Claims, 23 Drawing Sheets

(56) References Cited

U.S. PATENT DOCUMENTS

| | | | |
|---|---|---|---|
| 3,329,104 A * | 7/1967 | Gittings | A47B 3/02 108/117 |
| 3,700,070 A * | 10/1972 | King | B66F 11/042 108/145 |
| 3,837,427 A * | 9/1974 | Mattinson | E04G 1/14 182/115 |
| 3,983,960 A | 10/1976 | Sikli | |
| 4,249,749 A * | 2/1981 | Collier | B62B 1/00 108/145 |
| 4,867,277 A * | 9/1989 | Sloan | B66F 7/0608 187/243 |
| 4,930,598 A | 6/1990 | Murrill et al. | |
| 5,002,293 A * | 3/1991 | Gottselig | B62B 3/02 108/145 |
| 5,145,029 A | 9/1992 | Blasdell, Jr. et al. | |
| 5,207,333 A * | 5/1993 | Peng | A47B 43/00 187/211 |
| 5,351,843 A | 10/1994 | Wichman et al. | |
| 6,679,479 B1 | 6/2004 | Watkins | |
| 6,840,182 B2 * | 1/2005 | Price | A47B 77/02 108/101 |
| 7,640,869 B2 * | 1/2010 | Leng | A47B 3/02 108/116 |
| 7,647,923 B2 | 1/2010 | Dahl | |
| 7,669,260 B2 | 3/2010 | Smith et al. | |
| 7,856,924 B1 | 12/2010 | Stihi | |
| 9,132,848 B2 * | 9/2015 | Sekine | B66F 9/07586 |
| 9,532,645 B1 * | 1/2017 | Lin | A47B 9/16 |
| 9,540,220 B2 * | 1/2017 | Stewart | B66F 7/0625 |
| 9,668,600 B1 * | 6/2017 | Lau | A47J 47/14 |
| 2008/0128215 A1 * | 6/2008 | Nowitz | B66F 7/0625 187/243 |
| 2010/0314271 A1 * | 12/2010 | Baruch | A47B 43/00 206/349 |
| 2016/0280246 A1 * | 9/2016 | Pino | B66F 5/02 |

* cited by examiner

APPARATUS FOR STORING AND TRANSPORTING ITEMS

This application claims priority to U.S. provisional patent application Ser. No. 62/436,567, which is hereby incorporated by reference herein.

TECHNICAL FIELD

The present invention relates in general to an apparatus for storing, moving, and/or using items.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description is not intended to limit the scope of the invention, as claimed, but is presented for purposes of illustration only to describe the features and characteristics of the present invention, to set forth the best mode of operation of the invention, and to sufficiently enable one skilled in the art to practice the invention. Accordingly, the scope of the present invention is to be defined solely by the appended claims.

In describing and claiming the present invention, the following terminology will be used. The singular forms "a," "an," and "the" include plural referents unless the context clearly dictates otherwise. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D. As used herein with respect to an identified property or circumstance, "substantially" refers to a degree of deviation that is sufficiently small so as to not measurably detract from the identified property or circumstance. The exact degree of deviation allowable may in some cases depend on the specific context. As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary. As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

Figure 1:
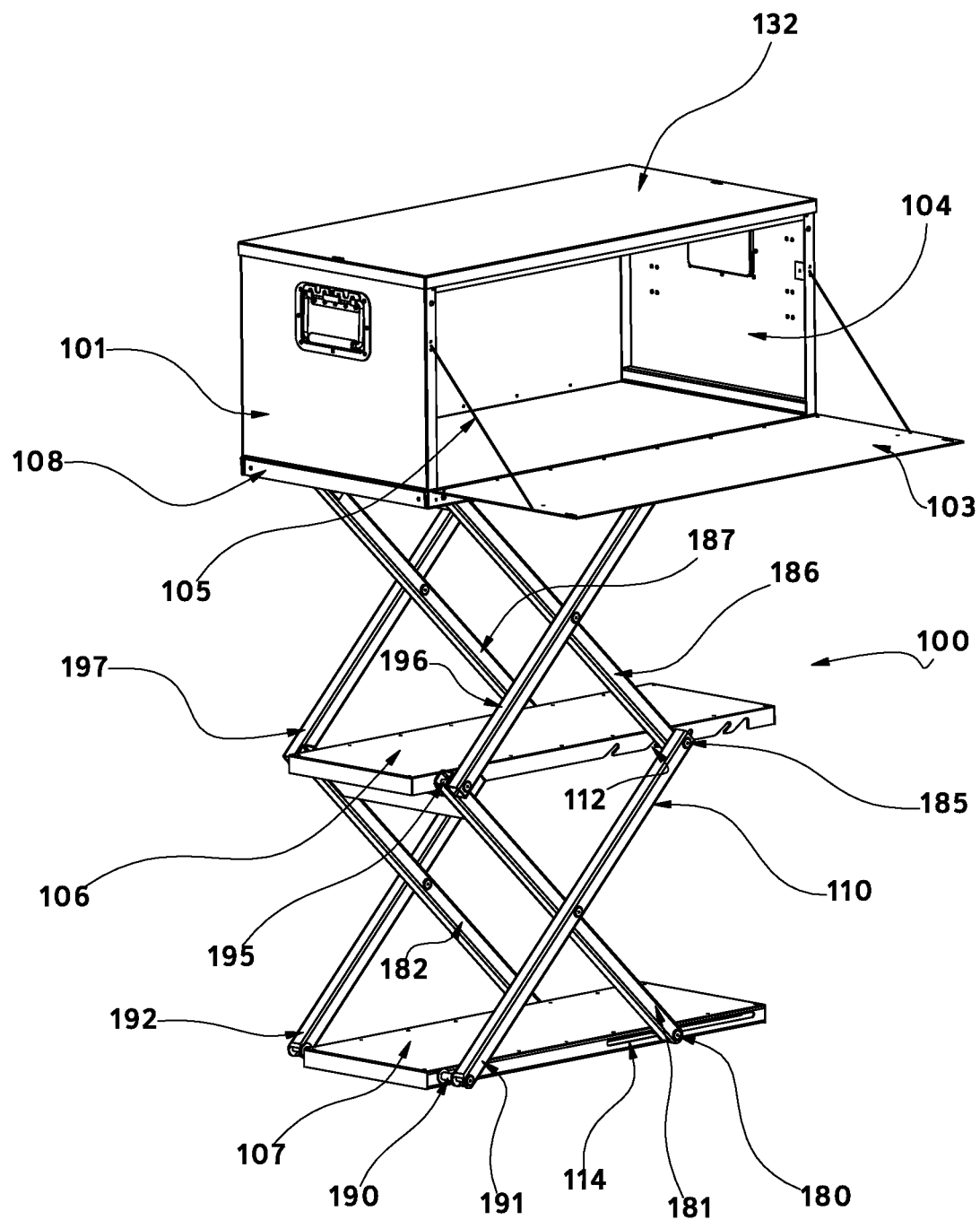
FIG. 1 illustrates embodiments of an apparatus with a storage container supported on an extendable support mechanism in which the storage container has at least one side door, which can be utilized as a work surface.

FIG. 1 illustrates an apparatus configured in accordance with embodiments of the present invention for storing, moving, and/or using items. In this non-limiting exemplary embodiment, a storage container 101 is mounted on an extendable support mechanism 100. The extendable support mechanism 100 utilizes a plurality of support legs 110 configured as a scissor lift. The extendable support mechanism 100 includes a bottom platform 107 and a mid-level platform 106, and may further include a top platform 108, each of which may be utilized for placing items thereon. One or more of the platforms 106-108 may be configured with substantially planar top surfaces. Additionally, each of the one or more platforms 106-108 may be formed as relatively thin rectangular boxes, though their underneath sides substantially omitted (thus forming a recessed underneath surface; e.g., see FIGS. 15A-15B) so that each platform has a top surface with four side surfaces.

The storage container 101 may be configured in any desirable shape, such as a square-shaped box, a rectangular-shaped box, etc. Furthermore, the storage container 101 may be manufactured from any appropriate materials, such as metal, fiberglass, plastic, wood, or even a rigid frame covered with a flexible material, such as canvas, cloth, etc. The storage container 101 may be mounted to the top platform 108 of the extendable support mechanism 100 (or the bottom of the storage container 101 forms the platform 108) using any well-known means, such as bolts, latches, fasteners, adhesives, etc.; or the apparatus may be configured so that the storage container 101 freely rests on the top platform 108 of the extendable support mechanism 100. As an example, a fastening device may be utilized to couple the storage container 101 to the top platform 108 of the extendable support mechanism 100 in a manner so that the storage container 101 is removable. The extendable support mechanism 100 may be manufactured from any well-known and appropriate materials, such as metal, wood, fiberglass, plastic, etc.

Items may be stored within the inside 104 of the storage container 101, which may be accessible by one or more doors configured within any one of the sides of the storage container 101. In the non-limiting example illustrated in FIG. 1, a side door 103 is hingeably coupled to the storage container 101 so that it may be opened. Some sort of appropriate support arm(s), or cable(s), 105 may be implemented within the storage container 101 to support the side door 103 in an open configuration so that the top surface of the inside of the side door 103 can be utilized as a work surface. Such a support arm 105 may be any well-known mechanism known in the art for performing such a function. In the example illustrated in FIG. 1, a flexible wire or cable is utilized for this purpose. When the side door 103 is opened, the support arm 105 maintains the positioning of the side door 103 relatively parallel to the ground.

The storage container 101 may be configured so that the top lid 132 of the storage container 101 can be hingeably coupled to the storage container for opening the top, or it can be completely removable (and which can be utilized for other uses as described further herein with respect to FIGS. 7G, 10, 11, and 13A-13C).

The plurality of support legs 110 includes a first pair of legs 181 and 191 arranged in a scissor-like formation, and a second pair of legs 182 and 192 arranged in a scissor-like formation, whereby these first and second pairs of legs are hingeably coupled between the first platform 107 and the second platform 106. The plurality of legs 110 further includes a third pair of legs 186 and 196 arranged in a scissor-like formation, and a fourth pair of legs 187 and 197 arranged in a scissor-like formation, whereby these third and fourth pairs of legs are hingeably coupled between the second platform 106 and the third platform 108.

As will be also further described hereinafter, the bottom platform 107 may include a pair of elongated slots 114 formed on opposite sides of the platform 107 so that a shaft 180 hingeably coupled to each of the proximate ends of the legs 181 and 182 can slide back and forth through the pair of elongated slots 114, which assists in enabling a user of the store, move, and/or use apparatus to change the desired height (elevation) of the storage container 101 relative to the ground. A shaft 190 passes through substantially conforming holes formed on opposite sides of the platform 107 (at an end of the platform 107 distal from the end in which the elongated slots 114 are formed) to couple together the distal ends of the legs 191 and 192, and to hingeably couple them to that distal end of the bottom platform 107. The distal ends of the legs 181 and 182 are hingeably coupled together by the shaft 195, which passes through substantially conforming holes formed within opposite sides of one end of the mid-level platform 106. This shaft 195 also couples together the proximate ends of the legs 196 and 197. The distal ends of the legs 181 and 182 and the proximate ends of the legs 196 and 197 are thus hingeably coupled to a first end of the mid-level platform 106. The distal ends of the legs 191 and 192 are hingeably coupled to each other by a shaft 185, which also hingeably couples together the proximate ends of the legs 186 and 187. The shaft 185 can be manually inserted into any one of the pairs of notches 112 formed within opposite sides of the platform 106, which also assists in enabling a user of the store, move, and/or use apparatus to position the height of the storage container 101 at various elevations relative to the ground due to the scissor-like action of the plurality of legs 110. Note, as illustrated in FIG. 1, the pairs of notches 112 are formed in a spaced relationship relative to each other towards an end of the platform 106 distal from the end of the platform in which the shaft 195 is inserted. This spaced relationship between the pairs of notches 112 will determine the various elevations to which a user may adjust the storage container 101.

Figure 3:
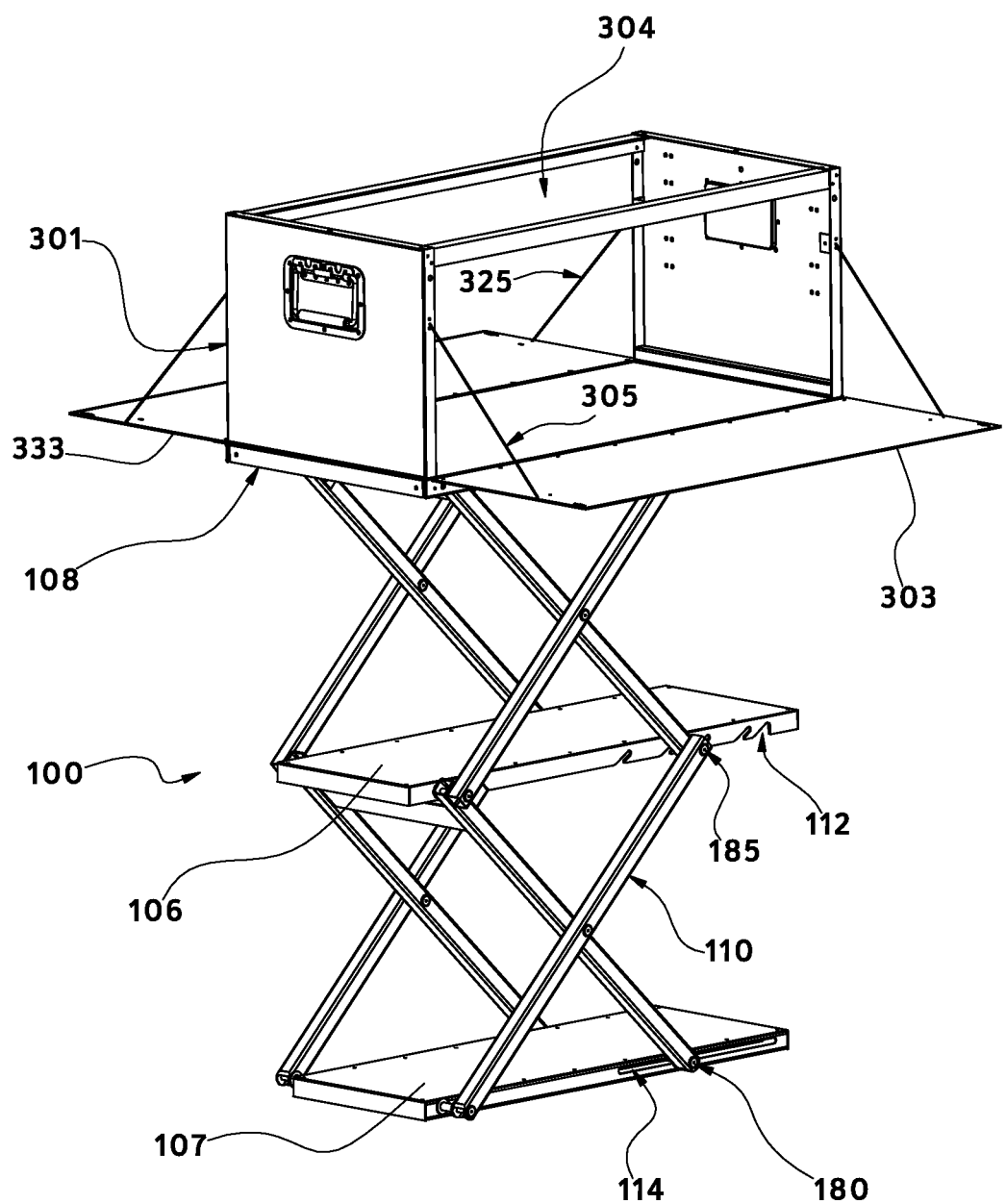
FIG. 3 illustrates embodiments of the present invention showing a storage container supported on an extendable support mechanism, in which the storage container has a plurality of side doors and a removable top.

FIG. 3 illustrates embodiments of the present invention showing a non-limiting example of a store, move, and/or use apparatus having a storage container 301 with a pair of side doors 303 and 333 in open positions. Furthermore, the side door 333 with its support arm 325 may be configured similarly as the side door 303 and its support arm 305. The storage container 301 is shown in FIG. 3 with its top removed. Such a feature may also be implemented within the storage container 101.

Figure 2:
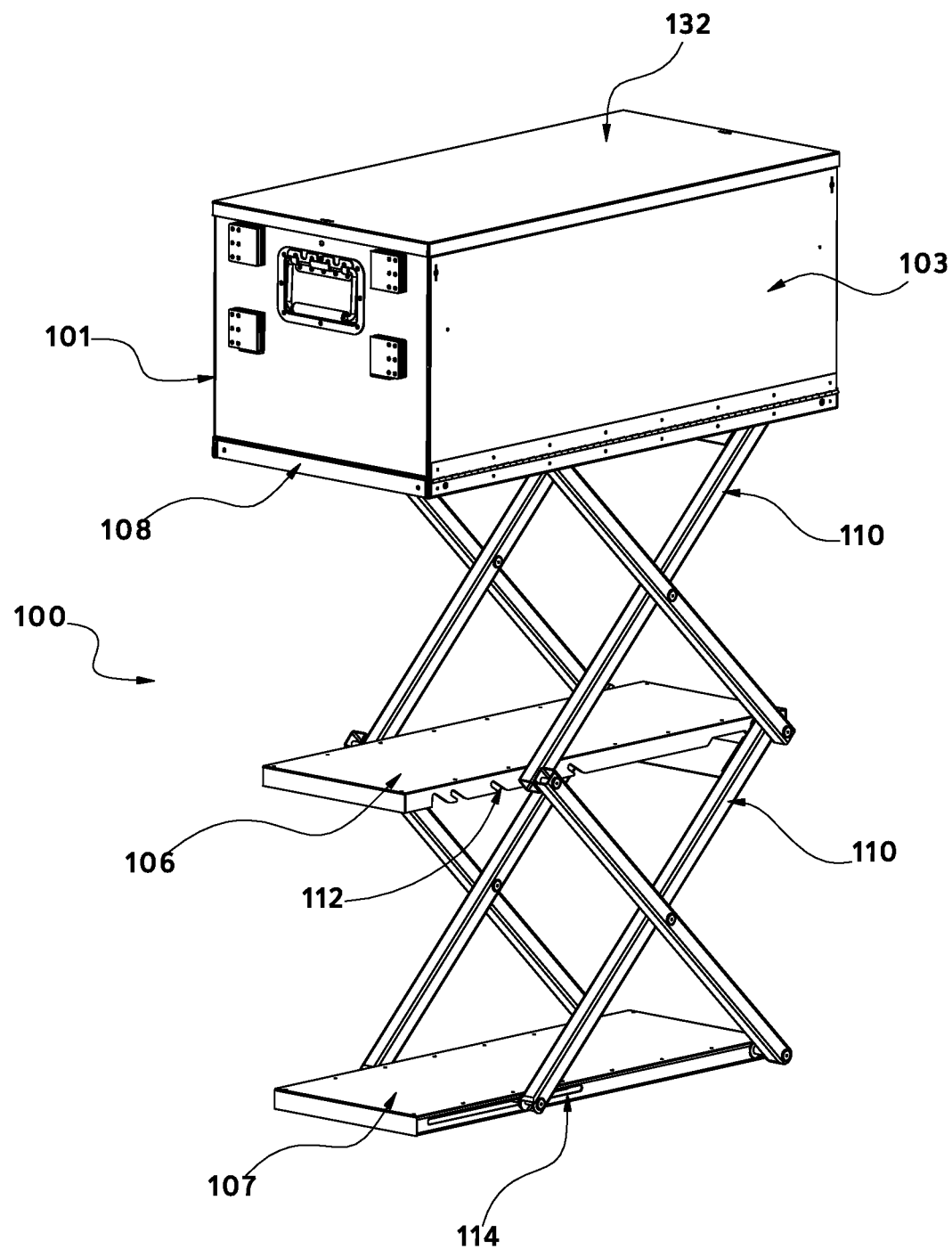
FIG. 2 illustrates the storage container of FIG. 1 with the side door closed.

FIG. 2 illustrates embodiments of the store, move, and/or use apparatus showing the side door 103 of the storage container 101, 301 in a closed position. Some sort of appropriate latch or lock mechanism (not shown) may be included to secure the side door 103 in the closed position. FIG. 2 also illustrates how the extendable support mechanism 100 can be manually adjusted by a user so that the height of the storage container 101, 301 is now positioned at a higher elevation relative to the ground than the configuration illustrated in FIG. 1 due to the shaft 185 now being inserted into a different pair of the notches 112. This can be accomplished by the user slightly lifting up on the storage container 101, 301 so that the shaft 185 is removed from one of the pairs of notches 112 and then positioned into a different pair of notches 112. Correspondingly, during this repositioning of the height of the storage container 101, 301 relative to the ground, the shaft 180 slides within the pair of elongated slots 114, thus further enabling the scissor-like operation of the plurality of legs 110. Additionally, note that FIG. 2 depicts the other side of the apparatus, showing that the pairs of notches 112, the elongated slots 114, and the holes through which the shafts 190, 195 are inserted are formed on those sides of the platforms 106 and 107. Furthermore, embodiments of the present invention are not limited to the number of pairs of notches 112, their relative spacing along the sides of the platform 106, and whether they are shaped to be at an angle or relatively perpendicular to a top of the platform 106 as depicted in the various figures herein.

Figure 4:
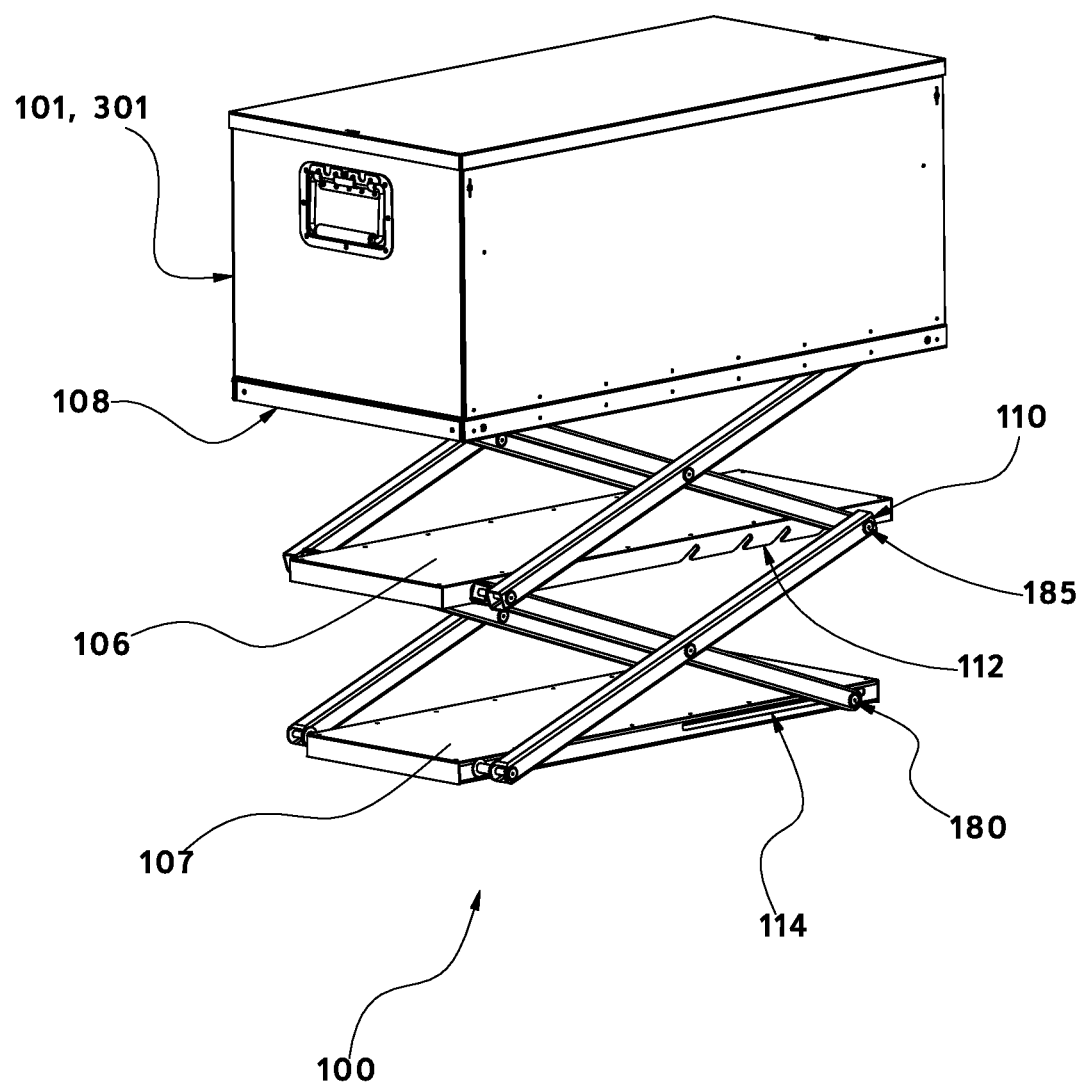
FIGS. 4-6 illustrate different elevations of the apparatus of FIG. 1 utilizing the extendable support mechanism.

FIG. 4 illustrates how the extendable support mechanism 100 can be manually adjusted by a user so that the height of the storage container 101, 301 is now positioned at a lower elevation relative to the ground. This also can be accomplished by the user slightly lifting up on the storage container 101, 301 so that the shaft 185 is removed from one of the pairs of notches 112 and then positioned into a different pair of notches 112 closer to the end of the platform 106.

Figure 5:
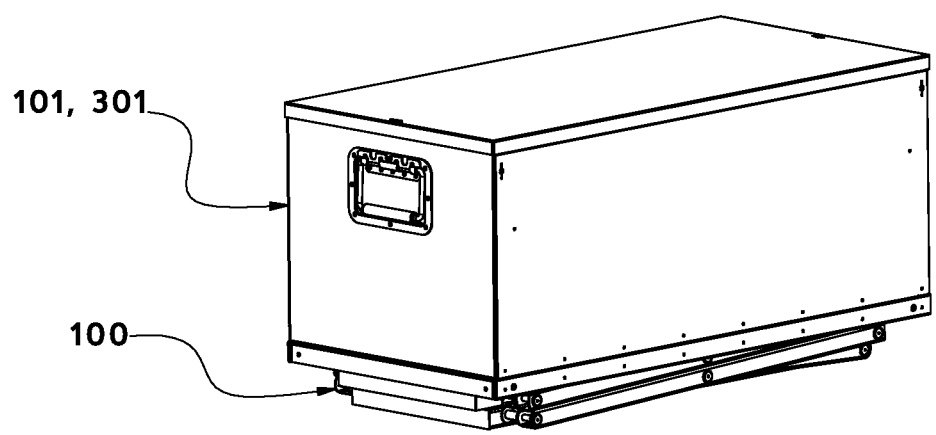

FIG. 5 illustrates how the extendable support mechanism 100 can be adjusted by a user to its lowest position relative to the ground. For example, this can be accomplished by the user slightly lifting up on the storage container 101, 301 so that the shaft 185 is removed from one of the pairs of notches 112 and then permitting the storage container 101, 301 to be lowered as close to the ground as the apparatus will allow (for example, as far as the pair of elongated slots 114 will permit the shaft 180 to slide all the way to one end of the elongated slots 114, and which may include not inserting the shaft into any pair of notches 112).

Figure 6:
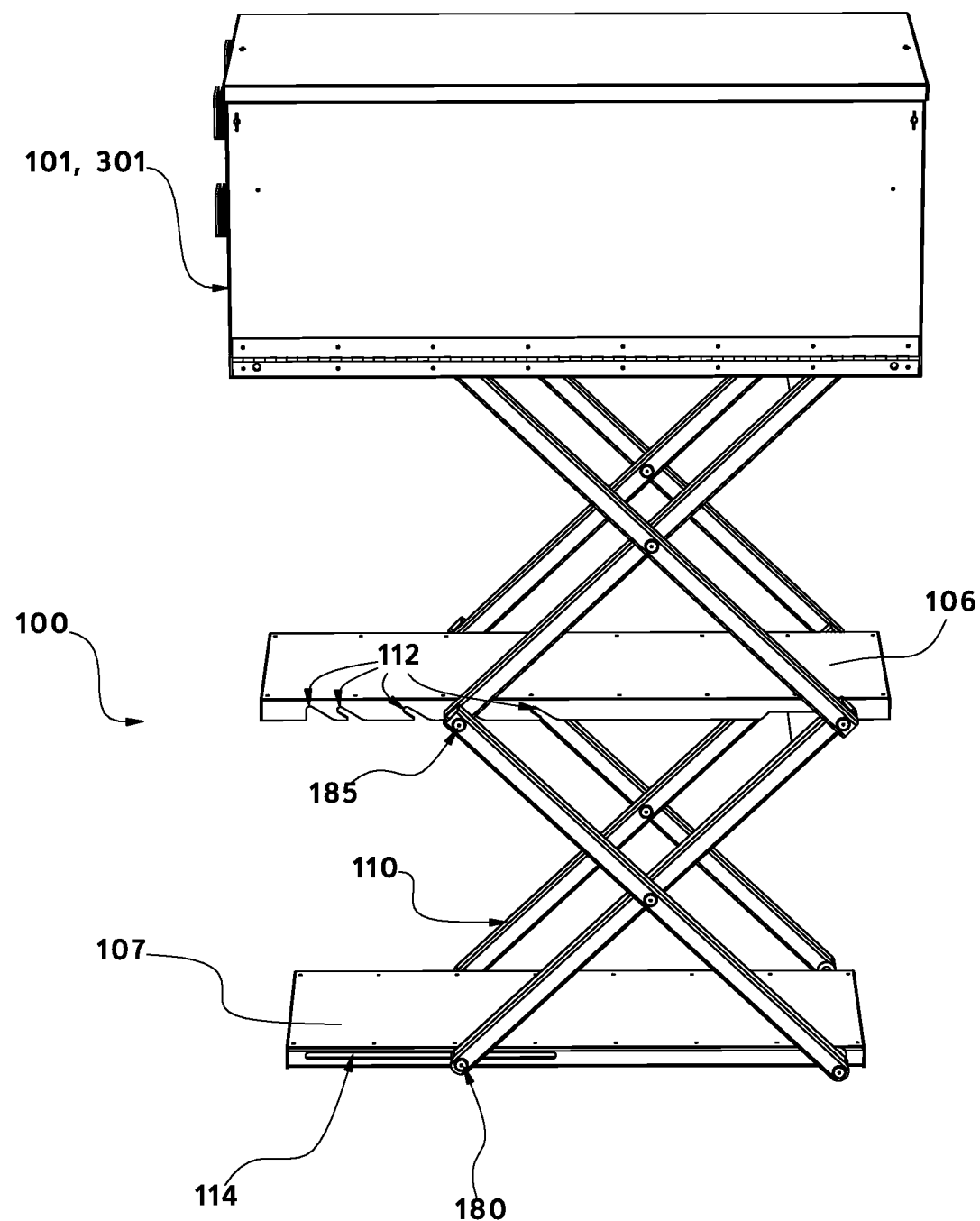

FIG. 6 illustrates how the extendable support mechanism 100 can be adjusted by a user so that the storage container 101, 301 is positioned at a higher elevation relative to the ground (for example as compared to the elevations shown in FIGS. 3-5). As can be seen, the shaft 185 is now inserted into a pair of notches 112 located closer towards a center of the platform 106. Correspondingly, the shaft 180 has been slid (by the action of the user raising the elevation of the storage container 101, 301) within the pair of slots 114 further towards a center of the bottom platform 107. FIGS. 1-6 thus illustrate how the extendable support mechanism 100 can be manually adjusted so that the various platforms 106-108 and/or the storage container 101, 301 can be positioned at various elevations relative to the ground by repositioning the shaft 185 within any one of the various pairs of notches 112 formed in the mid-level platform 106.

Figure 9:
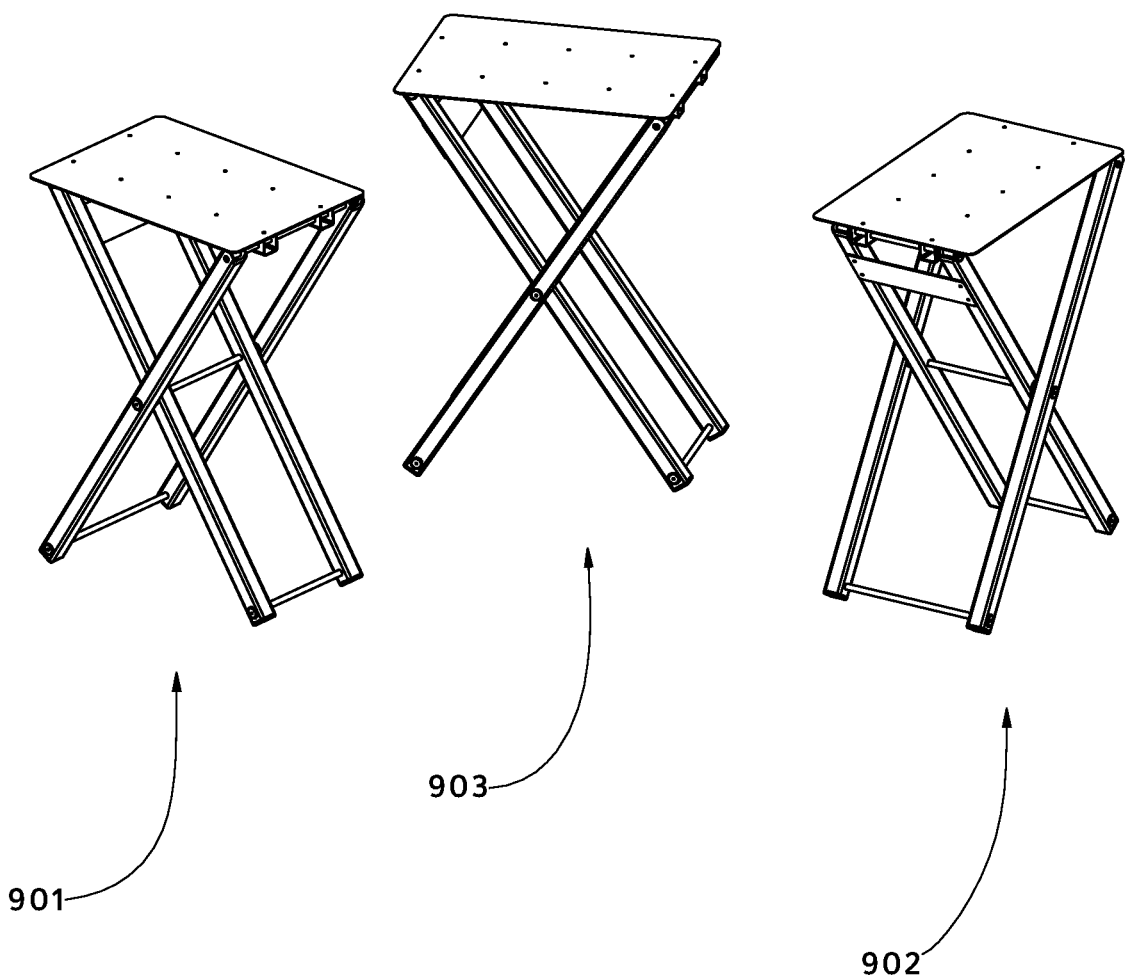
FIG. 9 illustrates one or more stools that can be incorporated into embodiments of the present invention.

Referring to FIG. 9, there is illustrated one or more folding stools 901 . . . 903, which may be incorporated into any embodiment of the store, move, and/or use apparatus disclosed herein, in accordance with alternative embodiments of the present invention. Though three stools are illustrated, any number of such stools 901 . . . 903 may be incorporated within such a store, move, and/or use apparatus, as will be further described with respect to FIGS. 7C-7G and 10-12. The stools 901 . . . 903 may be folding stools configured in a well-known manner in the art (e.g., such as depicted in FIG. 7C). Moreover, each of the stools 901 . . . 903 may be configured so that they may be stored within the storage container 101, 301, etc., or on top of any of the platforms 106, 107, and/or 108.

Figure 7A:
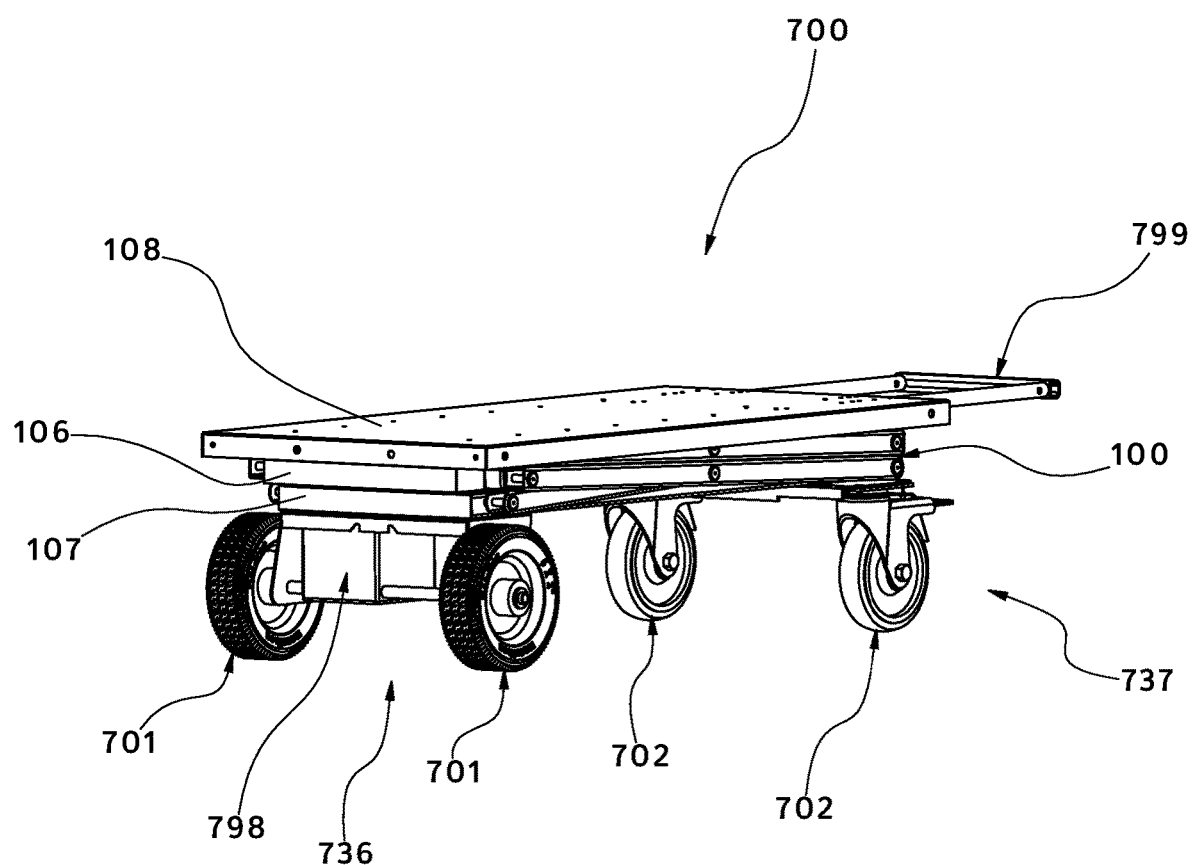
FIGS. 7A-7G illustrate various embodiments of the present invention including the incorporation of wheels and one or more handles.

FIG. 7A illustrates how embodiments of the present invention may be further implemented with one or more wheels 701, 702 attached to the underneath of the extendable support mechanism 100 for moving the entire store, move, and/or use apparatus 700. FIG. 7A also illustrates embodiments of the present invention in which the extendable support mechanism 100 can be utilized without a storage container (e.g., the storage containers 101, 301), and thus the top platform 108 may be utilized as a work surface. In accordance with embodiments of the present invention, distal ends of the legs 186 and 187 may be hingeably coupled together by a shaft similar to the shaft 195, which passes through substantially conforming holes formed within opposite sides of one end of the platform 108. And, as further described with respect to FIGS. 15A-15B, the distal ends of the legs 196 and 197 may be configured to interact with a locking mechanism. However, in accordance with alternative embodiments of the present invention, the top platform 108 may include a pair of elongated slots (not shown) substantially similar to the elongated slots 114 formed on opposite sides of the platform 108 so that a shaft substantially similar to the shaft 180 and hingeably coupled between the distal ends of the legs 196 and 197 can slide back and forth through the pair of elongated slots formed in the opposite sides of the platform 108, which assists in enabling a user of the store, move, and/or use apparatus to change the desired height (elevation) of the platforms 106, 108 relative to the ground. In accordance with further alternative embodiments of the present invention, the distal ends of the legs 186 and 187 and the legs 196 and 197 may not be each coupled together with respective shafts configured to couple to the platform 108, but instead, the platform 108 may simply rest on top of the distal ends of the legs 186 and 187 and the legs 196 and 197 (though the distal ends of the legs 186 and 187 may still be coupled together by a shaft, and the distal ends of the legs 196 and 197 may also be coupled together by a shaft). FIG. 7A additionally illustrates how a handle 799 may be coupled to the extendable support mechanism 100 for permitting a user to transport the entire apparatus 700. Such a handle 799 may be extendable from a retracted position, or may be affixed or hingeably coupled to the apparatus 700 (e.g., an end of the platform 108) utilizing well-known means.

The wheels 701 may be coupled to the extendable support mechanism 100 using any well-known wheel assembly 736. Likewise, the wheels 702 may be attached to the extendable support mechanism 100 using any well-known wheel assembly 737. In a non-limiting example, the wheel assembly 736 may be configured so that the wheels 701 do not pivot, while the wheel assembly 737 may be configured so that the wheels 702 are capable of pivoting in unison, or independently from each other, in order to enable a user to steer the apparatus 700.

Additionally, in accordance with alternative embodiments of the present invention, the wheel assembly 736 may be further implemented with some type of drive motor 798 to drive one or more of the wheels 701, such as an electric motor powered by an internally stored battery, to not only assist a user in moving the apparatus 700, but also as a vehicle to enable a user to ride upon the apparatus 700. Control of such a motor 798 may be performed utilizing any well-known means, including wired or wireless (e.g., via RF frequency control). Details of the motor 798 are not provided herein for the sake of simplicity.

Furthermore, each of the embodiments shown in FIGS. 1-6, 8, 11, and 13A-13C may be implemented with the same or similar wheel assemblies. Additionally, any of these embodiments incorporating such wheel assemblies may also be implemented with a drive motor the same as or similar to the motor 798.

Figure 7B:
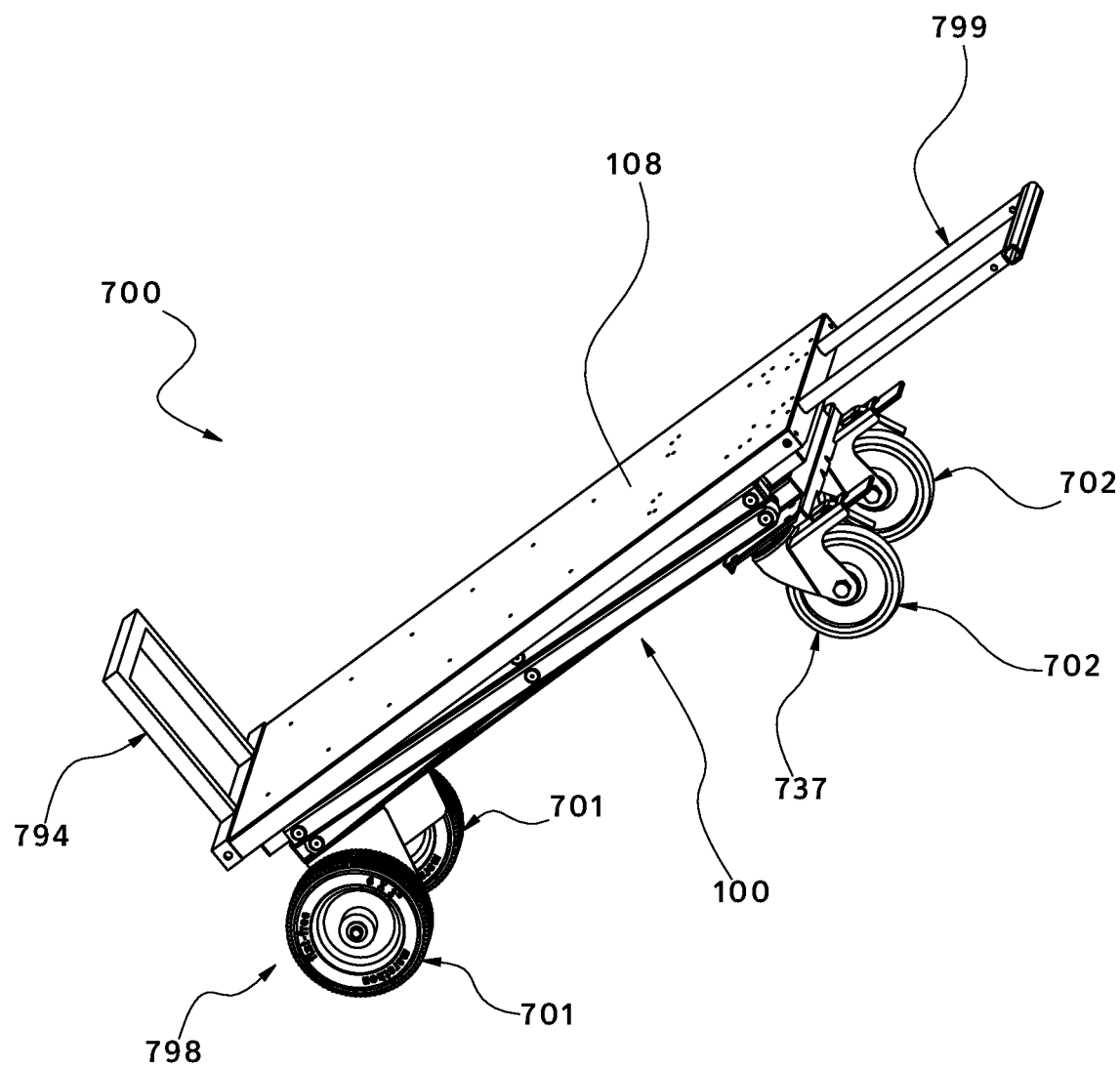
Figure 7C:
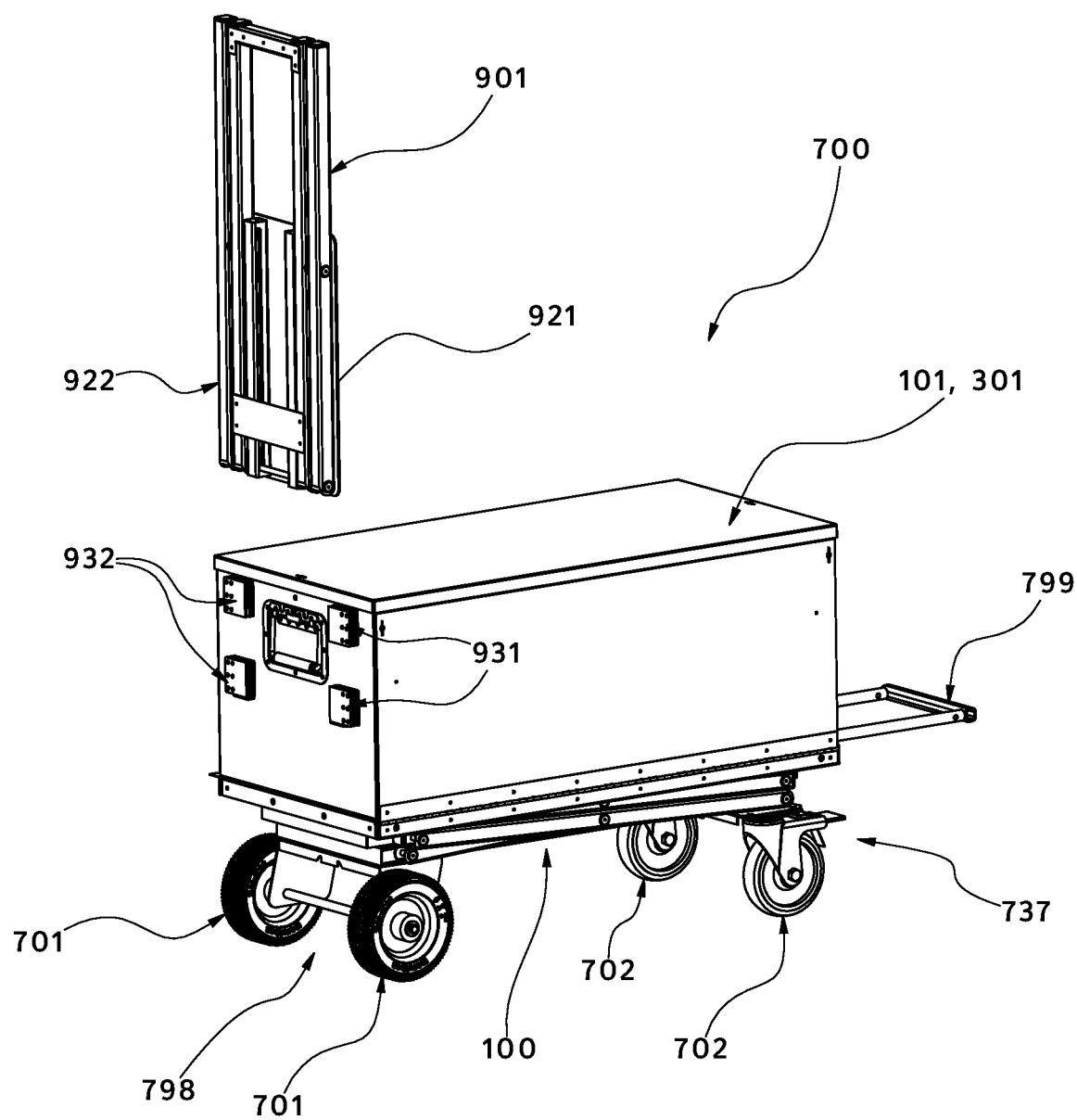

FIG. 7B illustrates an apparatus similar to the apparatus 700, but showing how a user may utilize the handle 799 to move the apparatus 700 on only the wheels 701 (for use as a dolly or handcart). Furthermore, FIG. 7B illustrates the apparatus 700 incorporating another handle 794, which may further serve to maintain an object (not shown) on top of the platform 708, which is being transported by a user utilizing the apparatus 700.

FIG. 7C illustrates further alternative embodiments of the apparatus 700. In this non-limiting, exemplary embodiment, a storage container 101, 301 is mounted to the extendable support mechanism 100.

Figure 7D:
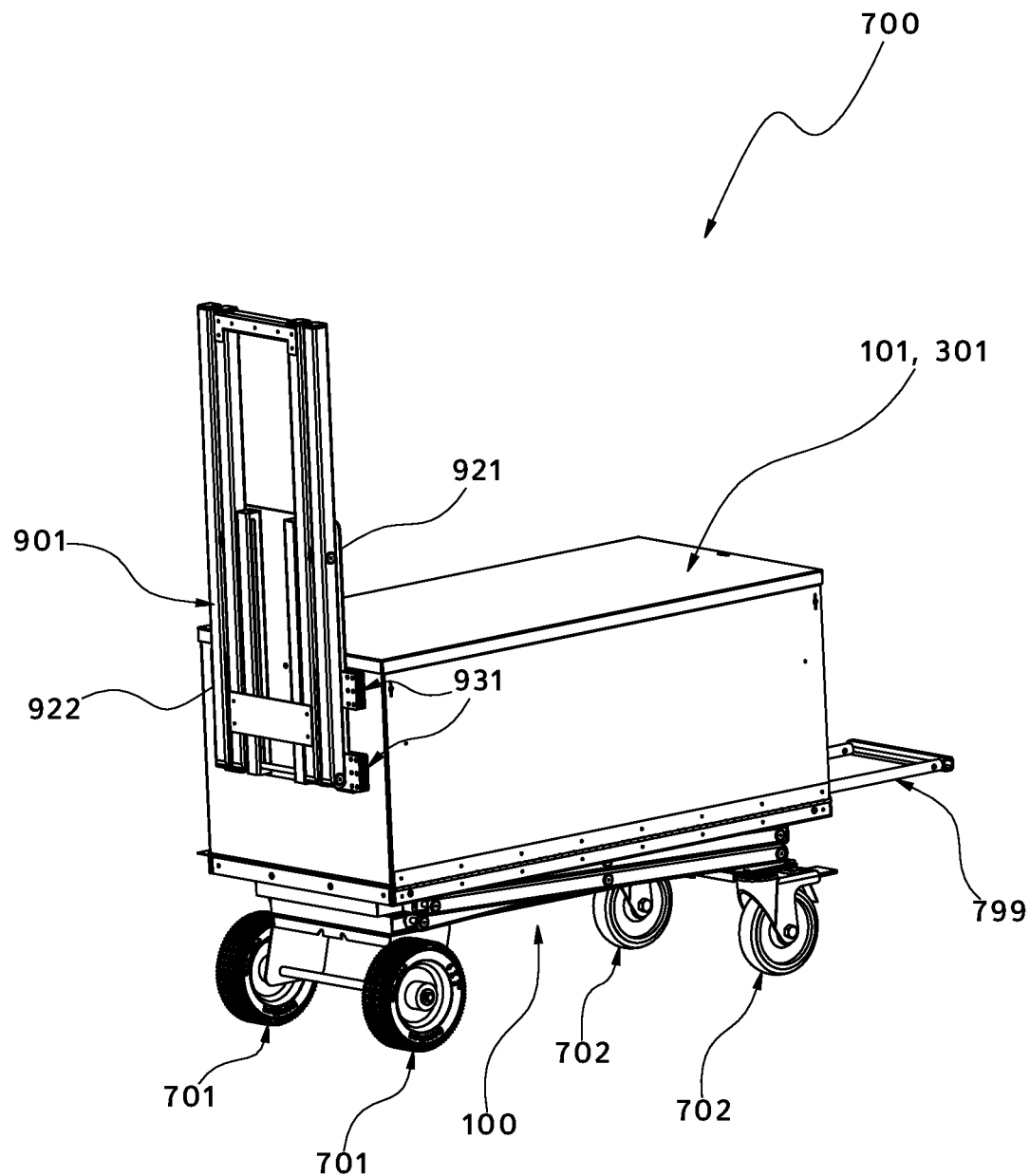

FIGS. 7C-7D illustrate how one of the stools 901 may be mounted to a side of the container 101, 301 to operate as another handle for utilization by a user to move the apparatus 700. FIG. 7C illustrates the stool 901 as it is being mounted, while FIG. 7D illustrates the stool 901 mounted to the side of the container 101, 301. Any suitable configuration for mounting the stools 901 to the side of the container 101, 301 may be utilized. In the exemplary embodiment illustrated in FIGS. 7C-7G, two pairs of brackets 931, 932 are affixed to a side of the storage container 101, 301, which enable a user to mount the stool 901 to the storage container 101, 301 by sliding down the stool 901 so that the edges 921 and 922 of the seat of the stool 901 engage into slots formed in the pairs of brackets 931, 932.

Figure 7E:
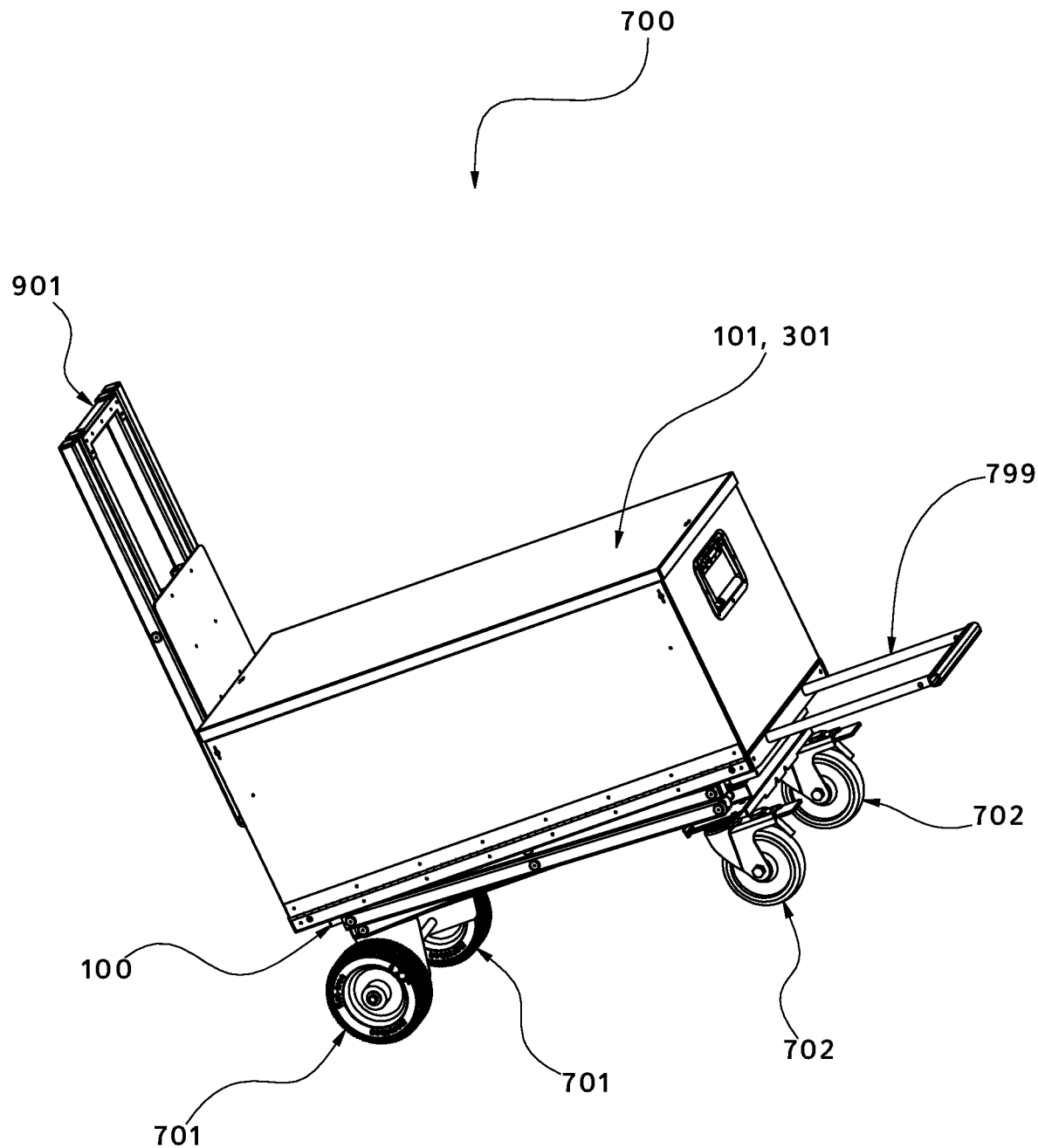

FIG. 7E shows a manner by which the apparatus 700 may be transported or moved, similar to the description pertaining to FIG. 7B.

Figure 7F:
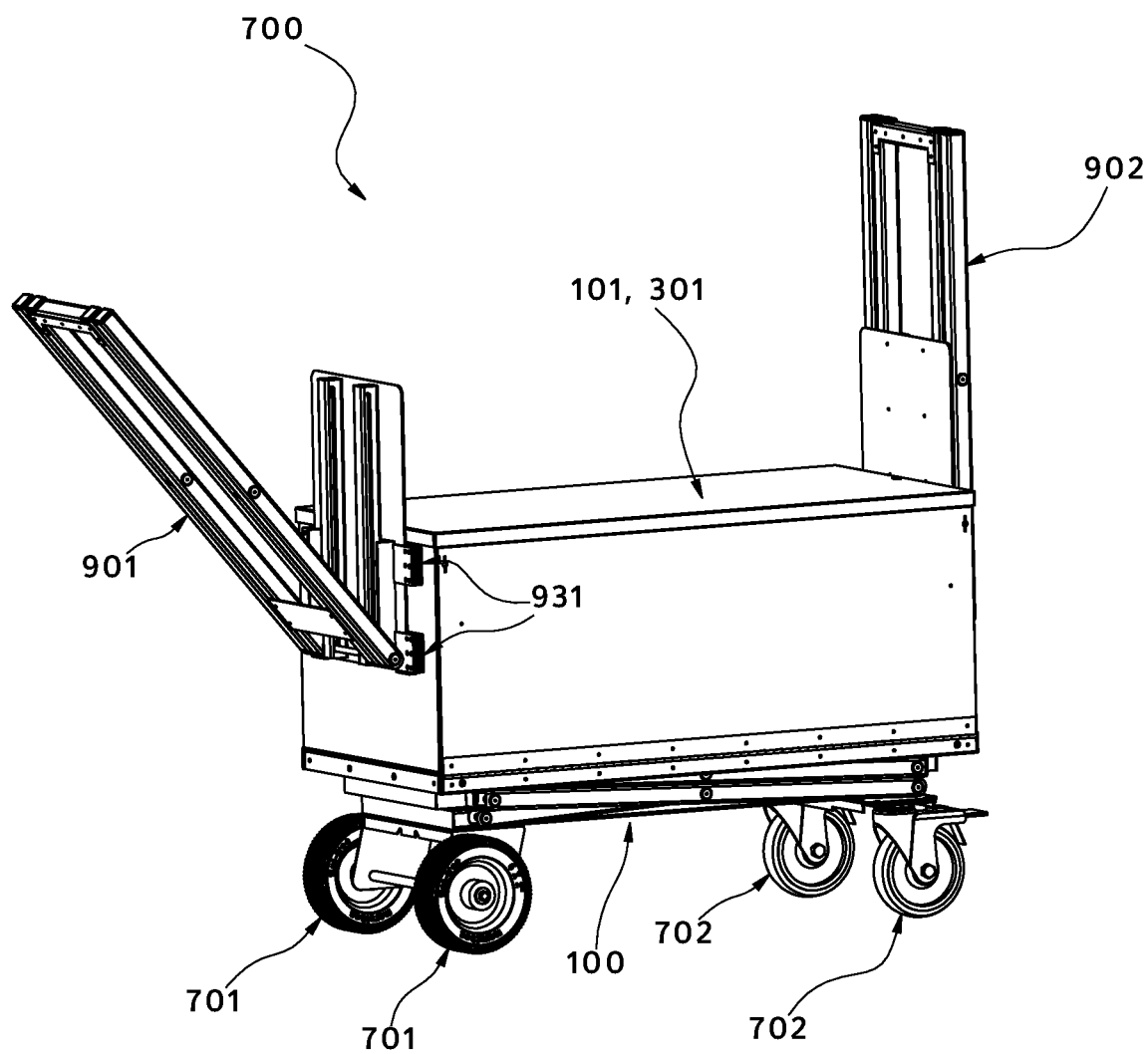

FIG. 7F illustrates how a couple of stools 901, 902 may be mounted on the storage container 101, 301, in the manner as described previously with respect to FIGS. 7C-7D. Additionally, FIG. 7F illustrates how the legs of either of the stools 901, 902 may be pivoted outwards (e.g., the stools 901, 902 are essentially unfolded) for utilization by a user to manually tow or push the entire system on its wheels 701 and 702.

Figure 7G:
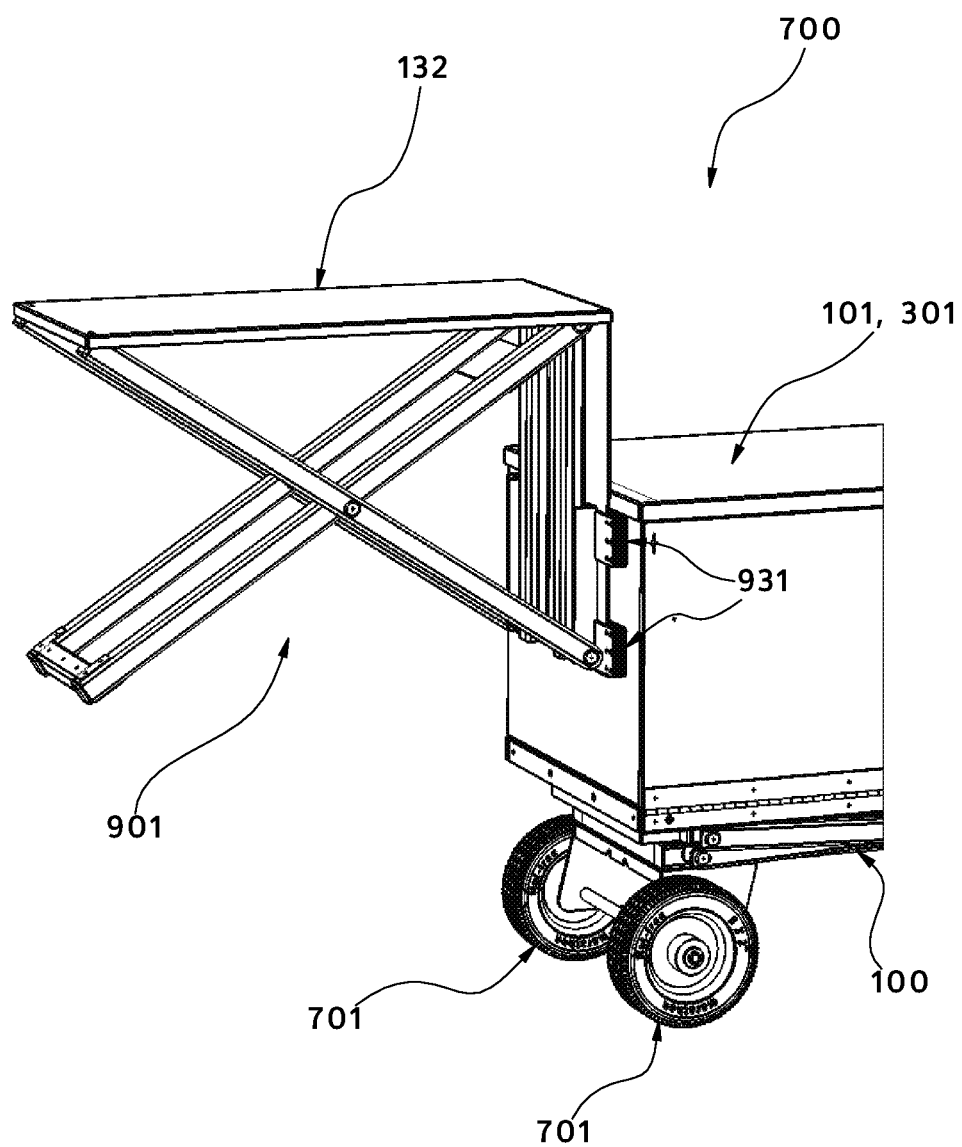

FIG. 7G illustrates a partial view of the apparatus 700 showing how the legs of a stool 901 mounted to the side of the storage container 101, 301 may be essentially unfolded, and an additional surface (e.g., similar in shape but smaller than the removable top lid 132 of the storage container 101) placed on top for providing an additional working surface.

Figure 8:
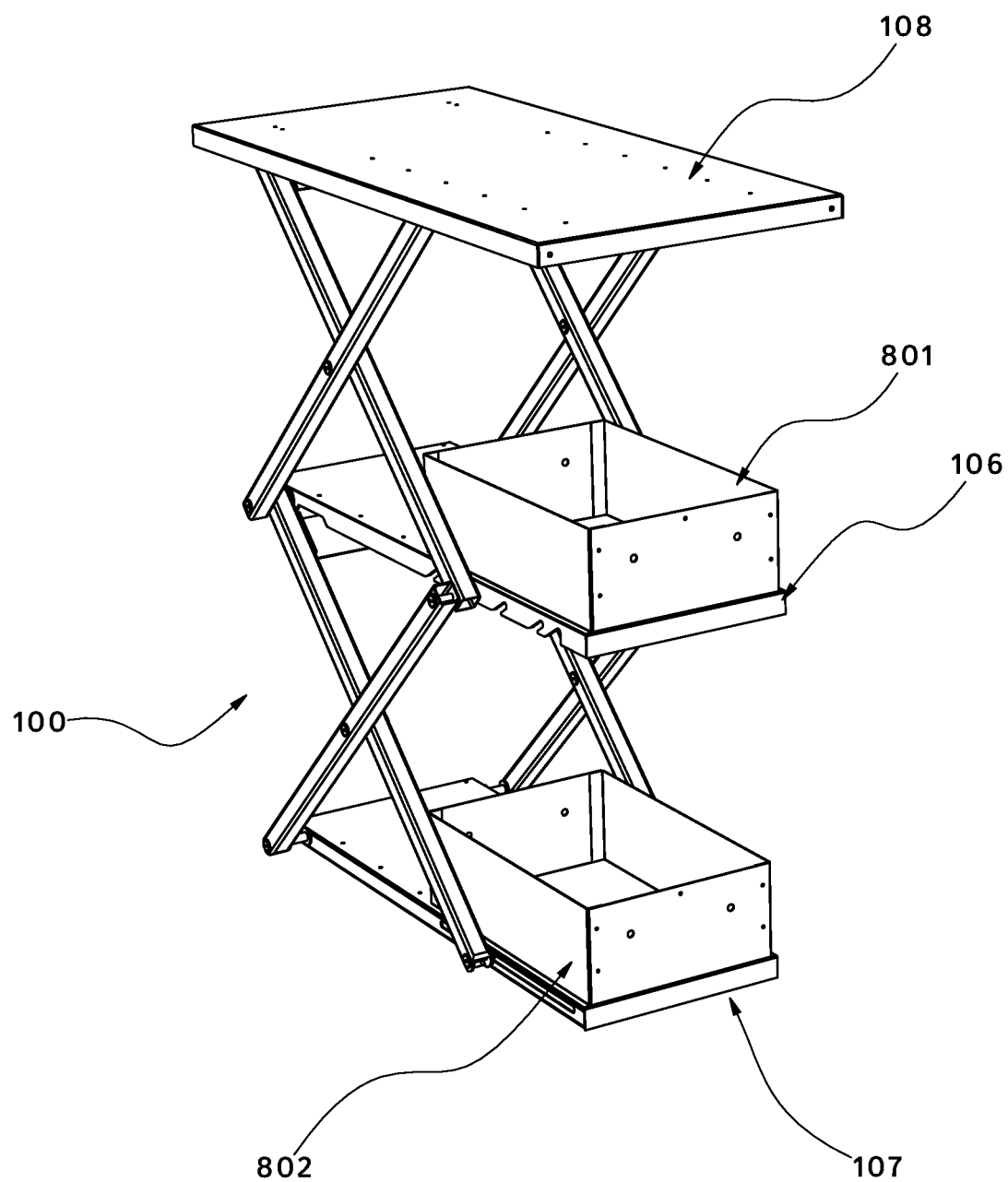
FIG. 8 illustrates embodiments of the present invention including storage units on the platforms.

FIG. 8 illustrates how one or more additional storage units 801 and 802 may be configured to be placed on either of the platforms 106 and/or 107 when the extendable support mechanism 100 is in an extended position. Moreover, such additional storage units 801, 802 may be configured for storage inside of the storage container 101, 301 (for example, if incorporated as illustrated in FIGS. 1-6).

Figure 10:
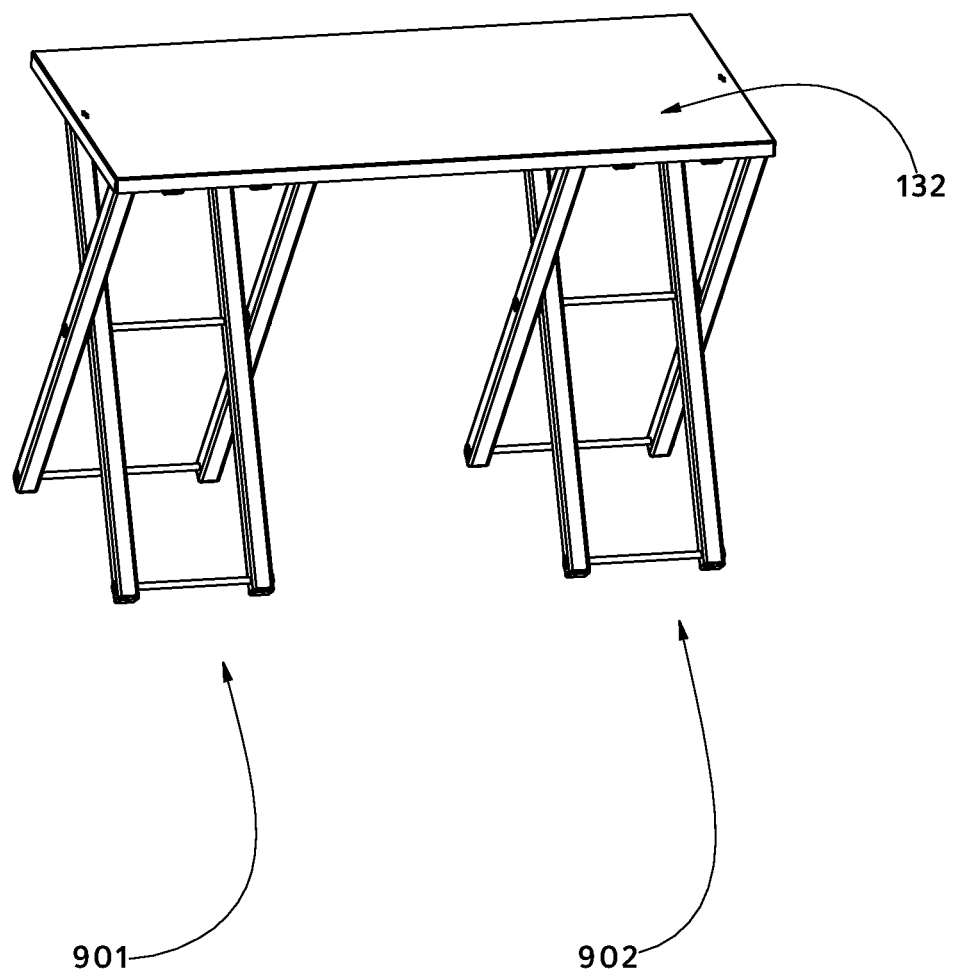
FIG. 10 illustrates alternative embodiments of the present invention in which a removable top lid of a storage container is installed over a plurality of stools to create a workspace.
Figure 15A:
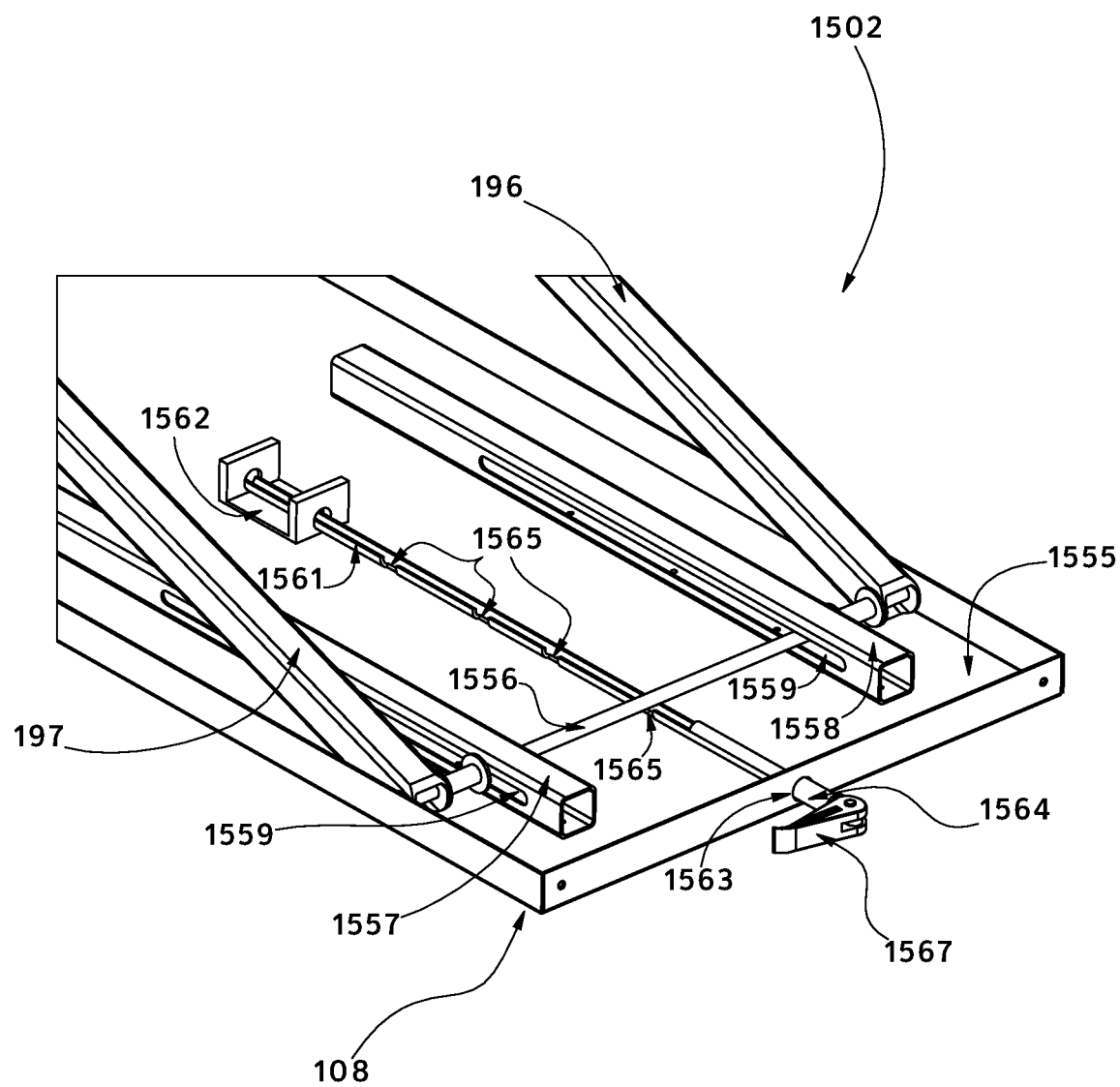
FIGS. 15A-15B illustrate alternative embodiments of the present invention showing a locking mechanism for securing an extendable support mechanism at a desired elevation.
Figure 15B:
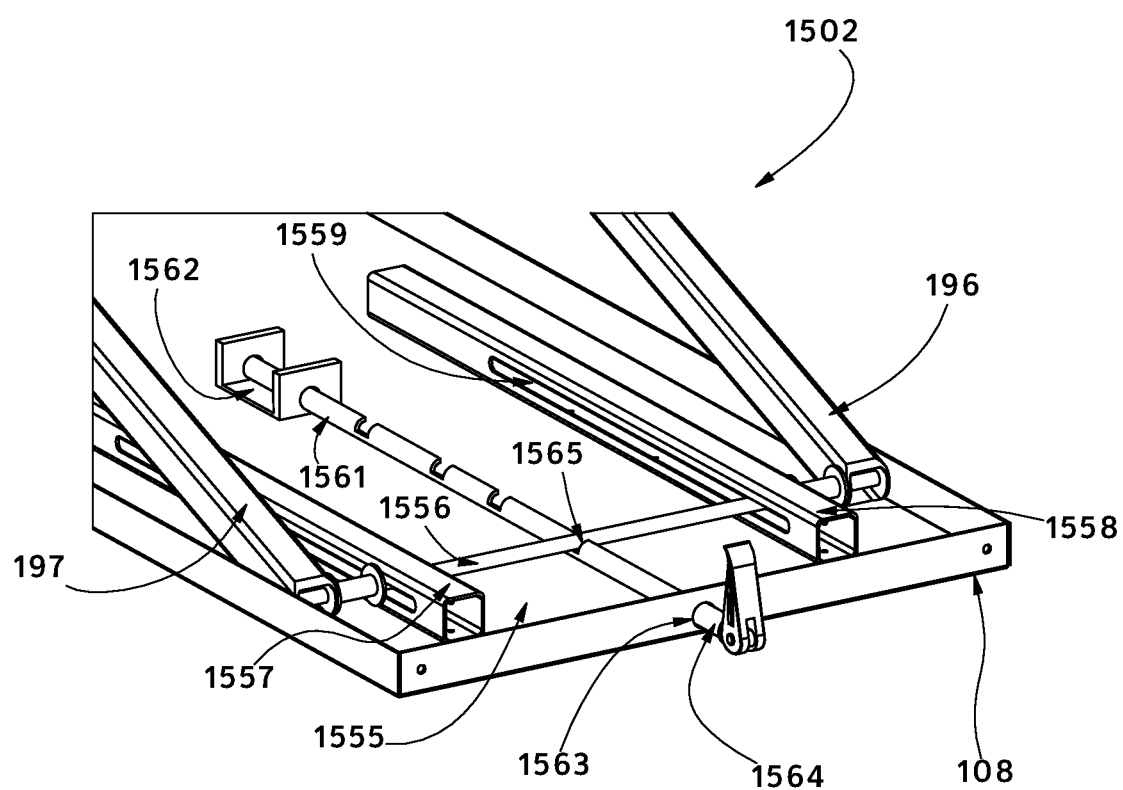

FIG. 10 illustrates alternative embodiments of the present invention in which a removable top lid 132 of the storage container 101 has a recessed underneath surface (e.g., with a recessed underneath surface similar to the depiction of the underneath surface of the platform 108 in FIGS. 15A-15B) that fits over one or more of the stools 901, 902 to form a workspace surface.

Figure 11:
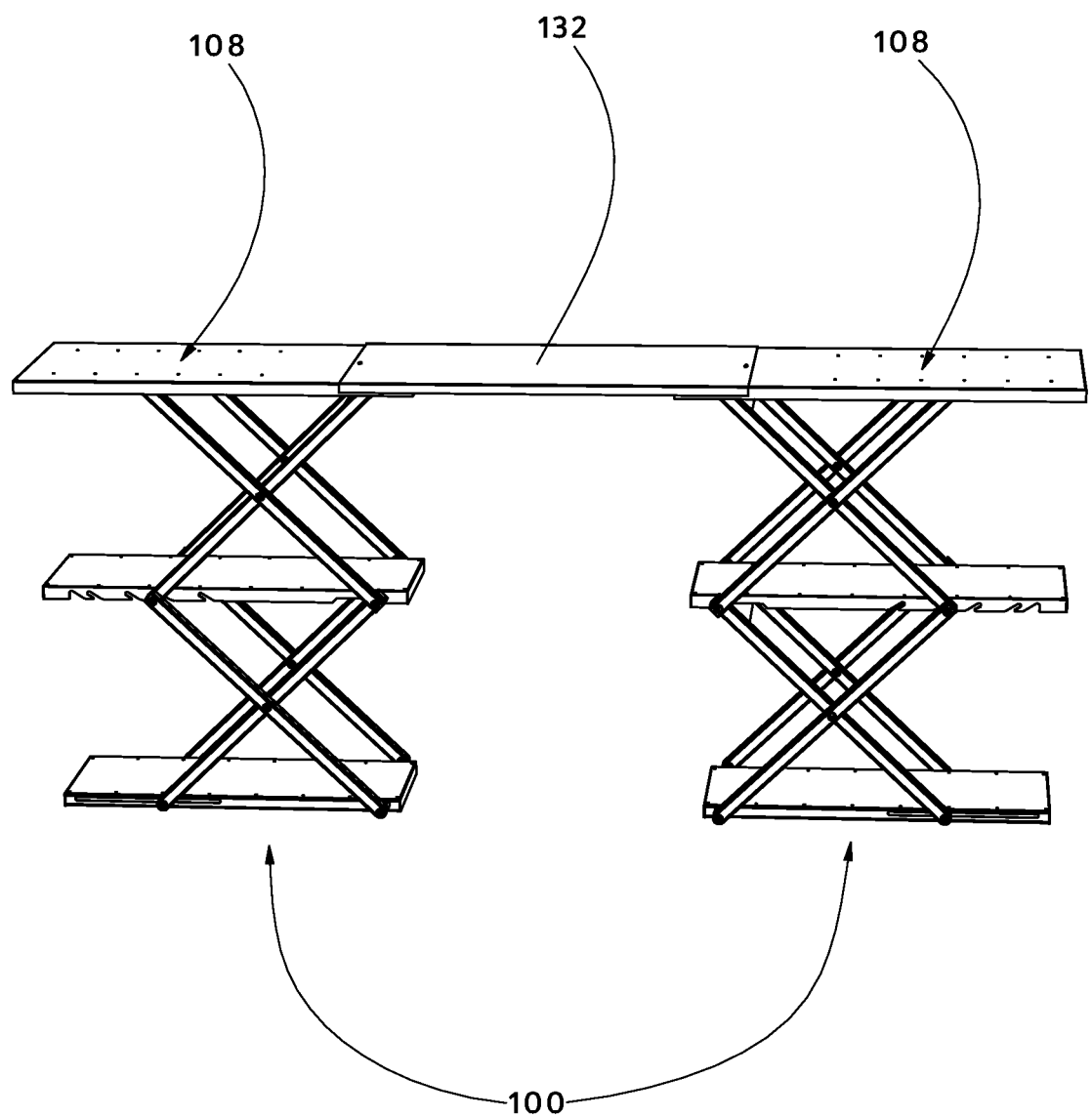
FIG. 11 illustrates alternative embodiments of the present invention in which a removable top lid of a storage container is utilized to create a workspace between two extendable support mechanisms.

FIG. 11 illustrates alternative embodiments of the present invention in which a removable top lid 132 of the storage container 101 (or any other appropriately configured working surface) may have an underneath surface that is configured to receive the ends of the top platforms 108 of a couple of extendable support mechanisms 100 to create a larger workspace surface.

Figure 12:
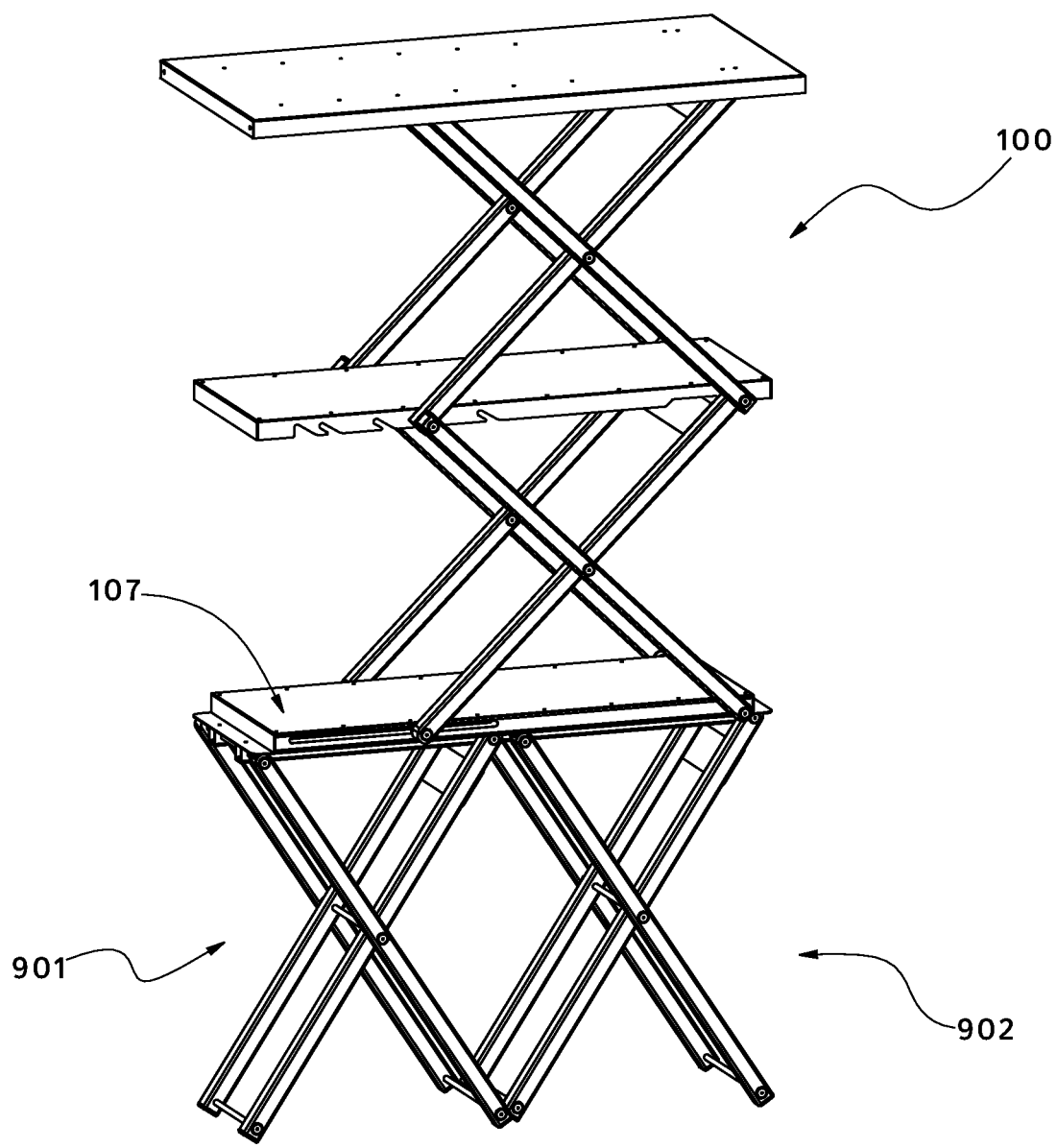
FIG. 12 illustrates alternative embodiments of the present invention in which a store, move, and/or use apparatus is installed on top of one or more stools to elevate an extendable support mechanism.

FIG. 12 illustrates alternative embodiments of the present invention in which the underneath of the bottom platform 107 of an extendable support mechanism 100 is formed (e.g., with a recessed underneath surface similar to the depiction of the underneath surface of the platform 108 in FIGS. 15A-15B) so that it fits on top of or over one or more of the stools 901, 902 in order to raise the elevation of the entire store, move, and/or use apparatus.

Figure 13A:
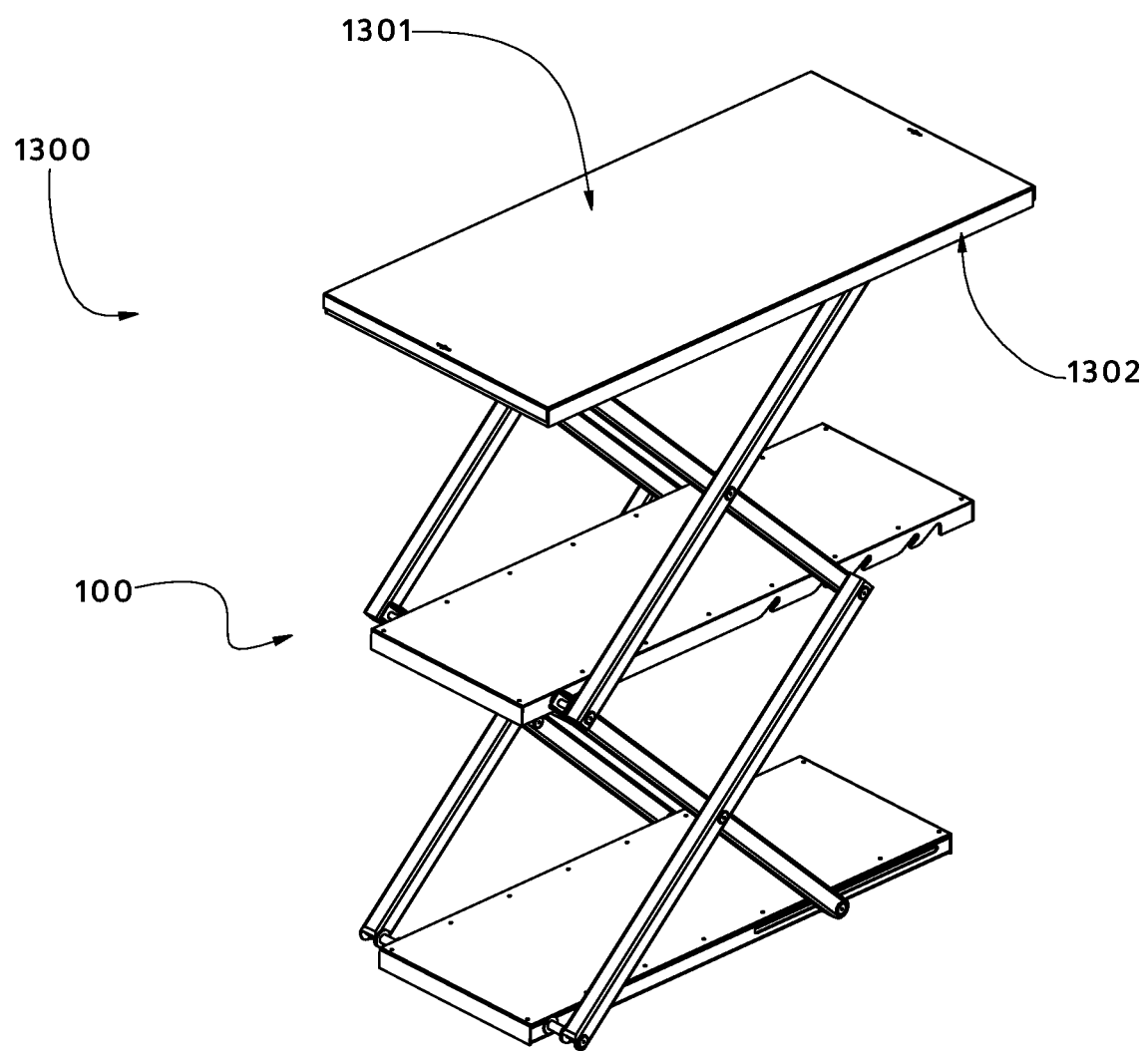
FIGS. 13A-13B illustrate alternative embodiments of the present invention in which a removable top of a storage container is slideably engaged with a top platform of an extendable support mechanism for creating an enlarged workspace.
Figure 13B:
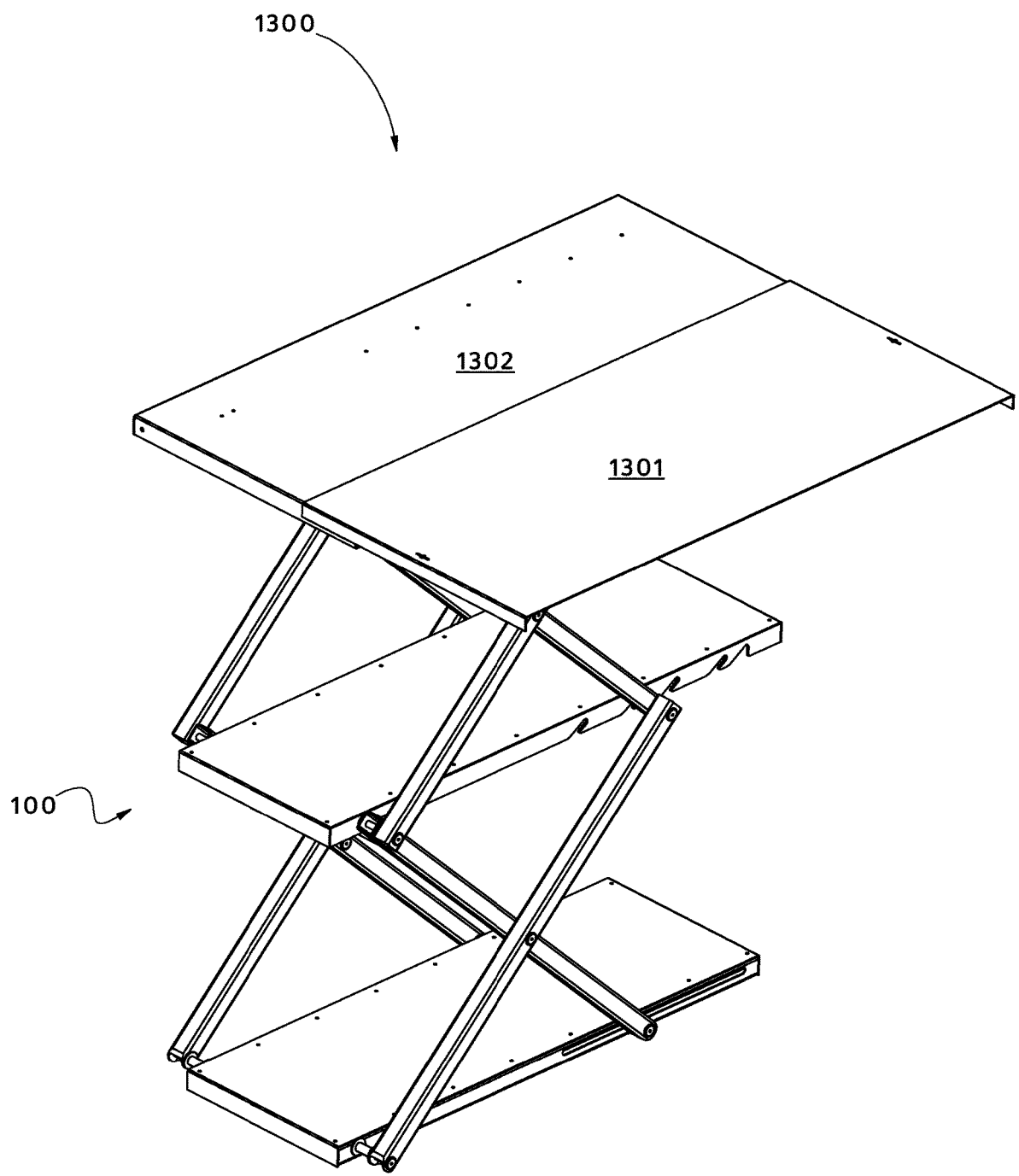

FIGS. 13A-13B illustrate alternative embodiments of the present invention for providing a larger top workspace surface for a store, move, and/or use apparatus 1300 incorporating the extendable support mechanism 100. A top lid 1301 may have an underneath surface that is configured to slideably engage and be adjacent with a top surface of the top platform 1302 (e.g., the platform 108) of the extendable support mechanism 100. FIG. 13A shows the top lid 1301 being slideably engaged with a top surface of the top of the platform 1302 to at least substantially completely cover it, wherein a bottom surface of the top lid 1301 is coplanar and adjacent to a top surface of the platform 1302. FIG. 13B illustrates how the top lid 1301 can then be slid over the platform 1302 to create a larger workspace surface, wherein the top surface of the platform 1302 and a top surface of the top lid 1301 are substantially coplanar with the bottom surface of the top lid 1301 only partially covering the top surface of the platform 1302. As depicted in FIGS. 13A-13B, such a slideable engagement may be implemented by edges of the top lid 1301 formed into essentially a square "C" shape in order to slideably engage with the edges of the platform 1302.

Figure 14:
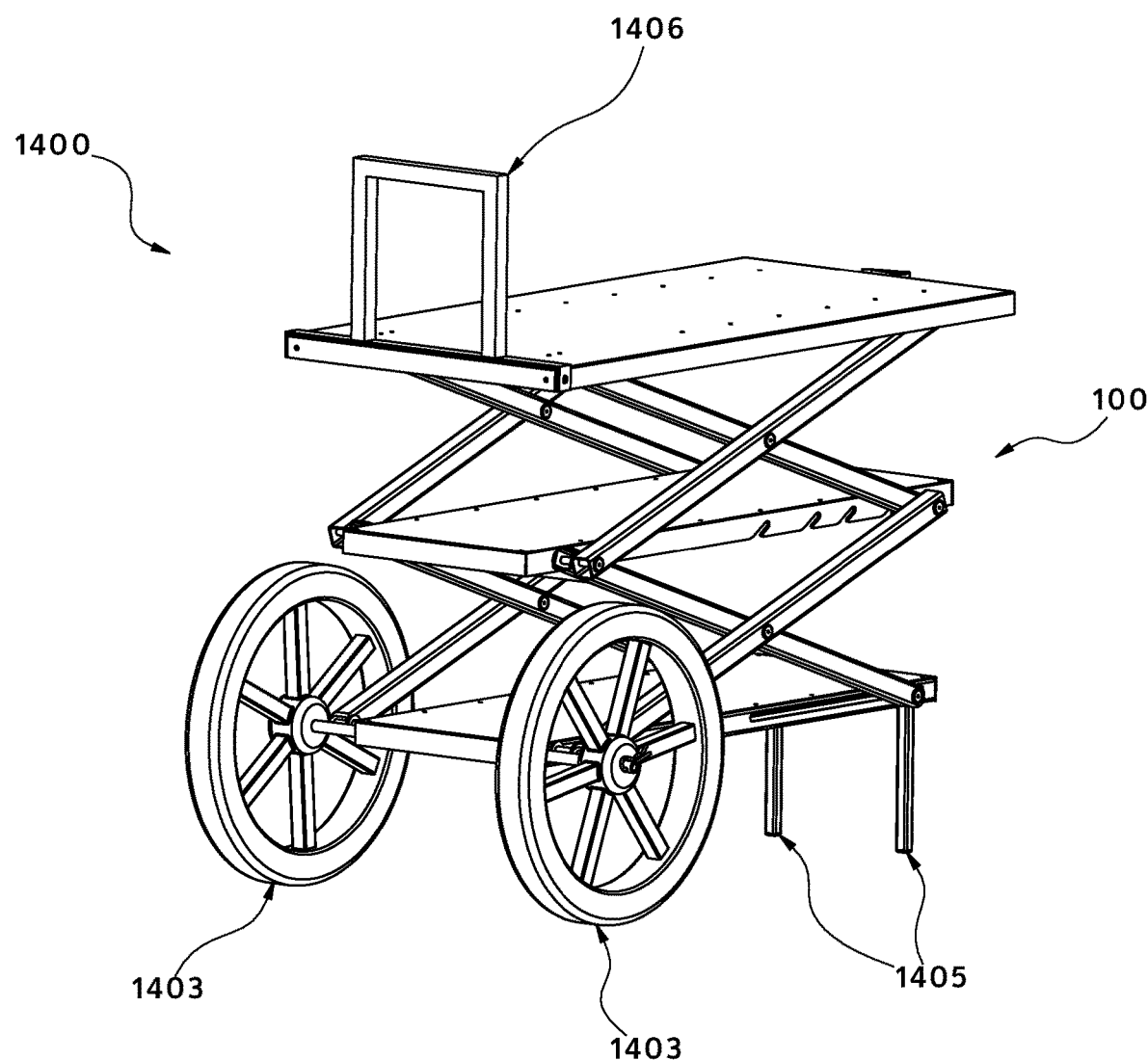
FIG. 14 illustrates alternative embodiments of the present invention with an additional wheel to store, move, and/or use the apparatus.

FIG. 14 illustrates alternative embodiments of the present invention, which show a store, move, and/or use apparatus 1400 incorporating the extendable support mechanism 100 that has a pair of wheels 1403 attached to the bottom platform 108 for transportation of the store, move, and/or use apparatus 1400. Additionally, a pair of retractable legs 1405 may be attachable to the bottom platform 108. FIG. 14 additionally shows a non-limiting alternative embodiment whereby a handle 1406 is mounted to the extendable support mechanism 100 of this configuration, which is similar to the handle 794 previously described with respect to FIG. 7B.

FIGS. 15A-15B illustrate a partial view of an underneath surface of the top platform 108, which provide for a locking mechanism 1502 to maintain a desired elevation of the store, move, and/or use apparatus (e.g., as shown in FIGS. 3-6, 8, and 11-14), in accordance with certain embodiments of the present invention. Such a locking mechanism 1502 may be incorporated into the extendable support mechanism 100 as an alternative to the mechanism illustrated in FIGS. 4 and 6, or in addition to such a mechanism.

FIG. 15A shows an underneath recessed surface 1555 of the top platform 108 of the extendable support mechanism 108. The legs 197 and 186 are rotatably coupled to the shaft 1556, which is configured to slide back and forth within a pair of elongated slots 1559 formed within each of the brackets 1557, 1558, which are affixed (using any suitable well-known means) to the underneath recessed surface 1555. A rod 1561 is mounted so that a first end of the rod 1561 is rotatably coupled to a bracket 1562 affixed (using any suitable well-known means) to the underneath surface 1555, with the other end of the rod 1561 passing through a hole 1563 formed within an edge surface of the platform 108 (alternatively, this other end of the rod 1561 may be rotatably coupled to another bracket (not shown) affixed (using any suitable well-known means) to the underneath surface 1555. The rod 1561 is configured with one or more notches 1565 formed therein, with each of the one or more notches 1565 configured to have a width greater than the diameter of the shaft 1556. The end 1564 of the rod 1561 that passes through the hole 1563 is coupled to a crank handle 1567 for turning the rod 1561 in a manner as described hereinafter. Alternatively, the rod 1561 may be manually turned by any other appropriate apparatus, or may merely be configured so that the user may turn the end 1564 of the rod 1561 in the desired manner as described.

Referring to both of FIGS. 15A and 15B, when the user desires to adjust the elevation of the entire store, move, and/or use apparatus (i.e., adjust the elevation of the platform 1555 relative to the ground), the rod 1561 is manually rotated along its longitudinal axis (e.g., approximately a quarter turn) so that none of the one or more notches 1565 are able to engage with the shaft 1556. This configuration is shown in FIG. 15A. Then, the elevation of the platform 1555 may be manually adjusted (up or down) by the user, causing the shaft 1556 to slide within the slots 1559 until the shaft 1556 is positioned proximate to one of the one or more notches 1565. At that time, the user will then manually rotate the rod 1561 so that the shaft 1556 is engaged within the desired selected notch 1565 and thus preventing the rod 1561 from sliding within the elongated slots 1565. Furthermore, some sort of locking mechanism (not shown) may be utilized with the rod 1561 to maintain the engagement between the shaft 1556 and the selected notch 1565 so that the rod 1561 does not inadvertently rotate, releasing the shaft 1556 from the selected notch 1565. For example, some sort of spring-like mechanism may be incorporated within the bracket 1562 to provide tension so that the rod 1561 continues to engage the shaft 1556 with the selected notch 1565 until the user turns the rod 1561 with the end 1564.

In accordance with certain embodiments of the present invention, the handle 1567 may be configured similarly to a bicycle quick release, which is capable of "locking" itself out. For example, a user can release it out to parallel with the rod 1561 for re-positioning (i.e., to adjust the elevation of the entire store, move, and/or use apparatus), or close it back up as shown to be locked.

What is claimed is:

1. An apparatus suitable for storing, moving, and/or using items comprising an extendable support mechanism comprising:
   a first platform, wherein the first platform comprises:
      a first pair of holes formed in opposite sides of the first platform at a first end of the first platform, and
      a first pair of elongated slots formed in the opposite sides of the first platform at a second end of the first platform, wherein the second end of the first platform is distal from the first end of the first platform;
   a second platform, wherein the second platform comprises:
      a second pair of holes formed in opposite sides of the second platform at a first end of the second platform, and
      a plurality of pairs of notches formed in the opposite sides of the second platform at a second end of the second platform, wherein the second end of the second platform is distal from the first end of the second platform;
   a third platform;
   a first pair of legs arranged in a scissor-like formation coupled between the first and second platforms;
   a second pair of legs arranged in a scissor-like formation coupled between the first and second platforms;
   a third pair of legs arranged in a scissor-like formation coupled between the second and third platforms; and
   a fourth pairs of leg arranged in a scissor-like formation coupled between the second and third platforms, wherein the first, second, third and fourth pairs of legs are coupled to the first, second, and third platforms to form a scissor lift operable to vary the distances between the platforms;
   a first shaft passing through the first pair of holes in the first platform and hingeably coupled to a first end of a first leg of the first pair of legs and a first end of a first leg of the second pair of legs;
   a second shaft passing through the first pair of elongated slots and hingeably coupled to a first end of a second leg of the first pair of legs and a first end of a second leg of the second pair of legs, wherein the second shaft is configured to operably slide between at least two positions within the first pair of elongated slots;
   a third shaft passing through the second pair of holes in the second platform and hingeably coupled to:
      a second end of the second leg of the first pair of legs,
      a second end of the second leg of the second pair of legs,
      a first end of a first leg of the third pair of legs, and
      a first end of a first leg of the fourth pair of legs, wherein the first and second ends of the second leg of the first pair of legs are distal from each other, wherein the first and second ends of the second leg of the second pair of legs are distal from each other;
   a fourth shaft hingeably coupled to:
      a second end of the first leg of the first pair of legs,
      a second end of the first leg of the second pair of legs,
      a first end of the second leg of the third pair of legs, and
      a first end of the second leg of the fourth pair of legs, wherein the third platform is supported by:
         second ends of the first legs of the third and fourth pairs of legs, and
         second ends of the second legs of the third and fourth pair of legs, wherein the second ends of the first legs of the third and fourth pairs of legs are distal from the first ends of the first legs of the third and fourth pairs of legs, respectively, and wherein the second ends of the second legs of the third and fourth pairs of legs are distal from the first ends of the second legs of the third and fourth pairs of legs, respectively;
   a fifth shaft hingeably coupled to the second ends of the first legs of the third and fourth pairs of legs; and
   a sixth shaft hingeably coupled to the second ends of the second legs of the third and fourth pairs of legs,
   wherein the third platform has a third pair of holes formed in opposite sides of a first end of the third platform, wherein the fifth shaft passes through the third pair of holes, and wherein the apparatus further comprises a locking mechanism attached to a bottom surface of the third platform operable to engage in a locked relationship with the sixth shaft to thereby prevent displacement of the third platform a greater distance away from the second platform.

2. The apparatus as recited in claim 1, wherein the third platform is coupled to at least one of the second ends of the first legs of the third and fourth pairs of legs, and the second ends of the second legs of the third and fourth pairs of legs.

3. The apparatus as recited in claim 1, further comprising a storage container positioned adjacent to a top surface of the third platform.

4. The apparatus as recited in claim 1, wherein the third platform has a third pair of holes formed in opposite sides of a first end of the third platform, wherein either the fifth or the sixth shaft passes through the third pair of holes.

5. The apparatus as recited in claim 1, wherein the fourth shaft is configured to selectively engage with the plurality of notches to operably position the first, second, and third platforms at various distances from each other in a locked relationship.

6. The apparatus as recited in claim 1, further comprising a lid slideably engaged with a top surface of the third platform, wherein a first position a bottom surface of the lid is coplanar and adjacent to a top surface of the third platform, and wherein a second position the top surface of the third platform and a top surface of the lid are substantially coplanar with the bottom surface of the lid only partially covering the top surface of the third platform.

7. The apparatus as recited in claim 1, further comprising a plurality of wheels attached to the first platform.

8. The apparatus as recited in claim 7, further comprising a drive motor configured to drive rotation of at least one of the plurality of wheels.

9. The apparatus as recited in claim 7, further comprising a handle affixed to an end of the third platform, wherein the handle is suitable to enable a user to move the apparatus along a surface with at least two of the plurality of wheels.

10. The apparatus as recited in claim 7, further comprising one or more retractable legs affixed to an end of the first platform opposite an end of the first platform to which the plurality of wheels are attached.

11. The apparatus as recited in claim 1, wherein the locking mechanism comprises:
   a pair of brackets attached to the bottom surface of the third platform, wherein each of the pair of brackets have elongated slots formed therein configured to slideably engage with the sixth shaft;
   a rod rotatably coupled to the bottom surface of the third platform, wherein the rod includes a plurality of notches formed therein, wherein each of the plurality of notches is configured to selectively engage with the sixth shaft; and a handle coupled to the rod and configured to enable a user to rotate the rod between first and second positions along its longitudinal axis, wherein when the rod is in the first position, one of the plurality of notches is engaged with the sixth shaft so that the sixth shaft is prevented from sliding within the elongated slots formed in the pair of brackets and thus maintaining the desired relative positioning between the first, second, and third platforms, wherein when the rod is in the second position, none of the plurality of notches is engaged with the sixth shaft so that the sixth shaft is free to slide within the elongated slots formed in the pair of brackets.

12. The apparatus as recited in claim 1, wherein the locking mechanism has a notch that engages with a circumference of the sixth shaft.

13. The apparatus as recited in claim 1, wherein the locking mechanism is configured to prevent displacement of the third platform a greater distance away from the second platform when a user lifts up on the third platform.

14. The apparatus as recited in claim 1, wherein the locking mechanism is configured to prevent relative movement between the second platform and the third platform.

15. An apparatus suitable for storing, moving, and/or using items comprising an extendable support mechanism comprising:
 a first platform;
 a second platform;
 a third platform;
 a first pair of legs arranged in a scissor-like formation coupled between the first and second platforms;
 a second pair of legs arranged in a scissor-like formation coupled between the first and second platforms;
 a third pair of legs arranged in a scissor-like formation coupled between the second and third platforms;
 a fourth pairs of leg arranged in a scissor-like formation coupled between the second and third platforms, wherein the first, second, third and fourth pairs of legs are coupled to the first, second, and third platforms to form a scissor lift operable to vary the distances between the platforms;
 a storage container positioned adjacent to a top surface of the third platform; and
 at least one pair of brackets affixed to one side of the storage container, wherein the brackets have open-ended slots configured to slideably engage with opposite edges of a seat of a folding stool in order to firmly engage the folding stool with the apparatus so that a portion of a leg of the stool is suitable for use as a handle to move the apparatus on a plurality of wheels attached to the first platform.

16. The apparatus as recited in claim 15, further comprising a fourth platform configured to engage with a side of the folding stool when it is unfolded so that the fourth platform is substantially horizontal and suitable for use as a work surface.

17. An apparatus suitable for storing, moving, and/or using items comprising an extendable support mechanism comprising:
 a first platform;
 a second platform;
 a third platform;
 a first pair of legs arranged in a scissor-like formation coupled between the first and second platforms;
 a second pair of legs arranged in a scissor-like formation coupled between the first and second platforms;
 a third pair of legs arranged in a scissor-like formation coupled between the second and third platforms; and
 a fourth pairs of leg arranged in a scissor-like formation coupled between the second and third platforms, wherein the first, second, third and fourth pairs of legs are coupled to the first, second, and third platforms to form a scissor lift operable to vary the distances between the platforms;
another extendable support mechanism comprising:
 a fourth platform;
 a fifth platform;
 a sixth platform;
 a first pair of legs arranged in a scissor-like formation coupled between the fourth and fifth platforms;
 a second pair of legs arranged in a scissor-like formation coupled between the fourth and fifth platforms;
 a third pairs of leg arranged in a scissor-like formation coupled between the fifth and sixth platforms; and
 a fourth pairs of leg arranged in a scissor-like formation coupled between the fifth and sixth platforms, wherein the first, second, third and fourth pairs of legs are coupled to the fourth, fifth, and sixth platforms to form a scissor lift operable to vary the distances between the platforms; and
a seventh platform configured to engage with tops of the third and sixth platforms when the two extendable support mechanisms are positioned a distance from each other so that the seventh platform covers a portion of each of the tops of the third and sixth platforms, wherein a top of the seventh platform and uncovered portions of the tops of the third and sixth platforms form a substantially coplanar work surface.

18. An apparatus suitable for storing, moving, and/or using items comprising an extendable support mechanism comprising:
 a first platform;
 a second platform;
 a third platform;
 a first pair of legs arranged in a scissor-like formation coupled between the first and second platforms;
 a second pair of legs arranged in a scissor-like formation coupled between the first and second platforms;
 a third pairs of leg arranged in a scissor-like formation coupled between the second and third platforms;
 a fourth pairs of leg arranged in a scissor-like formation coupled between the second and third platforms, wherein the first, second, third and fourth pairs of legs are coupled to the first, second, and third platforms to form a scissor lift operable to vary the distances between the platforms;
 a folding stool;
 a storage container positioned adjacent to a top surface of the third platform; and
 brackets affixed to a side of the storage container, wherein the brackets are slideably engaged with edges of a seat of the folding stool in order to firmly engage the folding stool with the apparatus so that a portion of a leg of the folding stool is suitable for use as a handle to move the apparatus on a plurality of wheels attached to the first platform.

19. The apparatus as recited in claim 18, further comprising a fourth platform engaged with a side of the folding stool when it is unfolded so that the fourth platform is substantially horizontal and suitable for use as a work surface.

* * * * *